United States Patent [19]

Hayashi et al.

[11] Patent Number: 5,003,030

[45] Date of Patent: Mar. 26, 1991

[54] THERMOPLASTIC WHOLLY AROMATIC COPOLYIMIDE ESTER AND PROCESS FOR PRODUCING THE SAME

[75] Inventors: Hideo Hayashi; Makoto Wakabayashi; Kenichi Fujiwara, all of Chiba, Japan

[73] Assignee: Idemitsu Petrochemical Co., Ltd., Tokyo, Japan

[21] Appl. No.: 352,278

[22] Filed: May 16, 1989

[51] Int. Cl.$^5$ .................... C08C 8/02; C08G 73/16
[52] U.S. Cl. .................... 528/170; 528/176; 528/210; 528/220; 528/289; 528/322
[58] Field of Search ............... 528/170, 176, 210, 220, 528/289, 322

[56] References Cited

U.S. PATENT DOCUMENTS

| | | | |
|---|---|---|---|
| 3,542,731 | 1/1970 | Culbertson | 528/170 |
| 4,161,470 | 7/1979 | Calundann | 528/206 |
| 4,176,223 | 11/1979 | Irwin | 528/170 |
| 4,383,105 | 5/1983 | Irwin | 528/170 |

FOREIGN PATENT DOCUMENTS

| | | |
|---|---|---|
| 0294195 | 12/1988 | European Pat. Off. |
| 58-67725 | 4/1983 | Japan. |
| 6004531 | 6/1983 | Japan. |

*Primary Examiner*—John Kight, III
*Assistant Examiner*—P. Hampton-Hightower
*Attorney, Agent, or Firm*—Antonelli, Terry, Stout & Kraus

[57] ABSTRACT

A thermoplastic wholly aromatic copolyimide ester consisting essentially of the recurring unit (I) represented by the following formula:

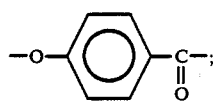

(I)

the recurring unit (II) represented by the following general formula:

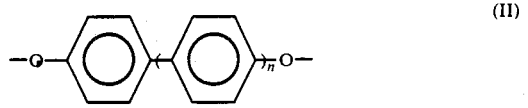

(II)

wherein n is an integer of 0 or 1; the recurring unit (III) represented by the following formula:

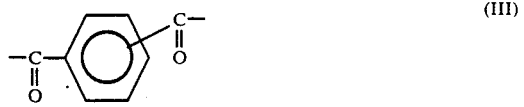

(III)

wherein the two carbonyl groups are present at para position or meta position of the benzene nucleus to each other; and the recurring units (IV 1) or (IV 2) represented respectively by the following formulas:

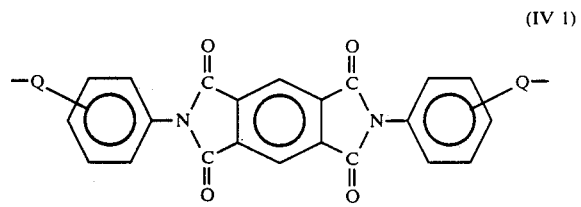

(IV 1)

wherein
—Q— is —O— or —CO—
and each Q is present at para position or meta position of the benzene nucleus respectively to the imide group, or (IV 2)

(Abstract continued on next page.)

with the proviso that the recurring units (I), (II), (III), and (IV) are bonded to form ester bonds, and wherein the thermoplastic wholly aromatic copolyimide ester has a melt viscosity of from 1.0 to $1.0 \times 10^5$ Pa·s as measured at a shear stress of 0.025 Mpa and at a temperature of from 300° to 400° C.

9 Claims, 3 Drawing Sheets

THERMOPLASTIC WHOLLY AROMATIC COPOLYIMIDE ESTER AND PROCESS FOR PRODUCING THE SAME

BACKGROUND OF THE INVENTION (a) Field of the Invention

The present invention relates to thermoplastic wholly aromatic copolyimide esters having excellent dimensional stability and to processes for producing the same. More particularly, the present invention relates to novel thermoplastic wholly aromatic copolyimide esters and processes for producing the same which may be suitably used for electric or electronic parts, etc., which require heat resistance and excellent dimensional precision and dimensional accuracy in both flow direction (machine direction: MD) and a direction making a right angle with the flow direction (transverse direction: TD).

(b) Description of the Related Art

In recent years, thermoplastic resins having extremely small coefficients of linear expansion in MD have come to be known. These resins are a series of resins called thermotropic liquid-crystalline polymers, and some examples of such resins are the wholly aromatic copolyesters disclosed in Japanese Patent Application Laid-open No. 54-77691.

Although these polyesters have small coefficients of linear expansion in MD, they are yet unsatisfactory in dimensional stability because their coefficients of linear expansion in TD are much the same as those of common thermoplastic resins.

Also, polyimide esters containing both imide bonds and ester bonds in their polymer molecules have been well known. For example, those having excellent heat resistance are disclosed in U.S. Pat. No. 3,542,731, those improved in heat resistance, mechanical properties, and processability in Japanese Patent Application Laid-open No. 58-67725, those having high moduluses of elasticity in Japanese Patent Application Laid-open No. 55-84326, those having high toughness in Japanese Patent Application Laid-open No. 58-113222, and those having high rigidity in Japanese Patent Application Laid-open No. 60-4531. However, these polyimide esters are also hardly satisfactory in dimensional stability.

SUMMARY OF THE INVENTION

An object of the present invention is to provide a novel thermoplastic wholly aromatic copolyimide ester having excellent dimensional stability and dimensional precision in both MD and TD.

Another object of the present invention is to provide a process which is particularly advantageous for practical production of the thermoplastic wholly aromatic copolyimide esters having the excellent properties described above.

That is, the present invention provides a thermoplastic wholly aromatic copolyimide ester consisting essentially of the recurring unit (I) represented by the following formula:

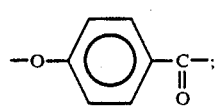

the recurring unit (II) represented by the following general formula:

wherein n is an integer of 0 or 1; the recurring unit (III) represented by the following formula:

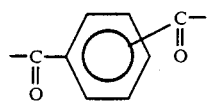

wherein the two carbonyl groups are present at para position or meta position of the benzene nucleus to each other; and the recurring units (IV 1) or (IV 2) represented respectively by the following general formulas:

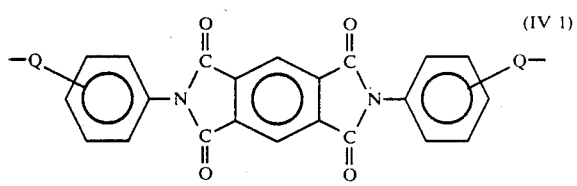

wherein
—Q— is —O— or —CO—
and each Q is present at para position or meta position of the benzene nucleus respectively to the imide group,

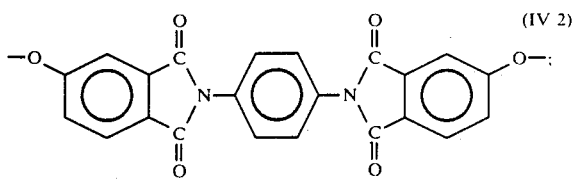

with the proviso that the recurring units (I), (II), (III), and (IV 1) or (IV 2) are bonded to form ester bonds, and wherein the thermoplastic wholly aromatic copolyimide ester has a melt viscosity of from 1.0 to $1.0 \times 10^5$ Pa·s as measured at a shear stress of 0.025 Mpa and at a temperature of from 300° to 400° C.

BRIEF DESCRIPTION OF THE INVENTION

DESCRIPTION OF THE PREFERRED EMBODIMENT

Figure 1:
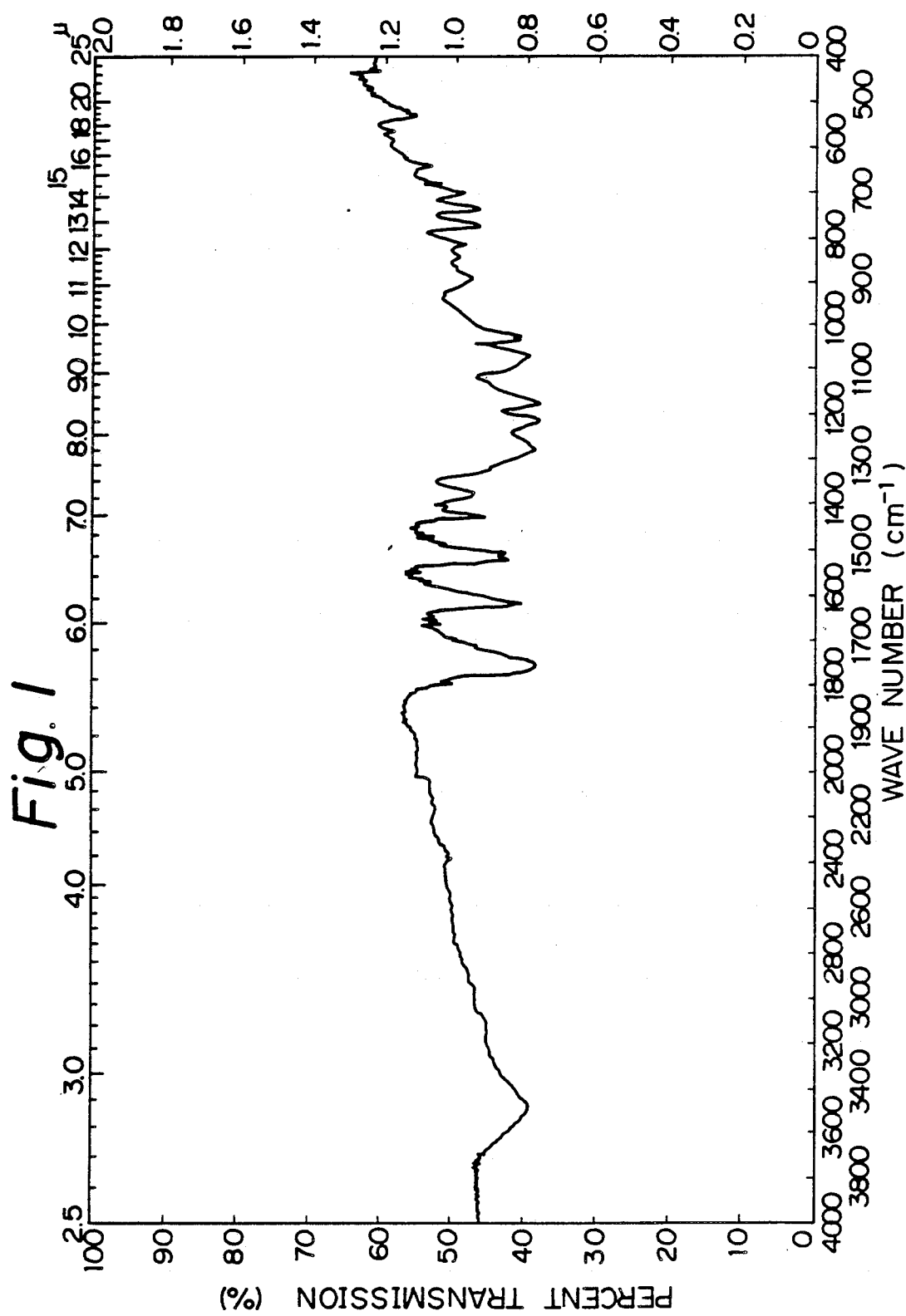
FIG. 1 is an infrared spectrum of the copolyimide ester obtained in Example 3.

The recurring unit (II) is, concretely,

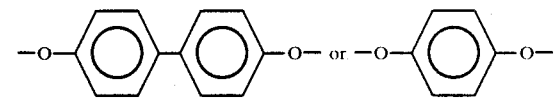

The preferred copolyimide ester contains the recurring unit (II) of

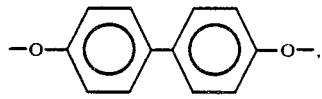

or contains

as the main component of the recurring unit (II).

The thermoplastic wholly aromatic copolyimide ester of the present invention (hereinafter referred to occasionally as copolyimide ester) may contain either one of them or both of them in a desired ratio.

The recurring unit (III) is, concretely,

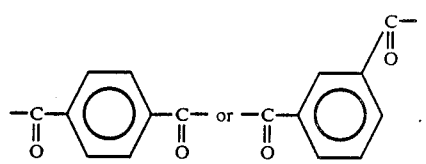

Preferably, the copolyimide ester of the present invention contains 2 to 22 mole % of the recurring unit represented by the following formula:

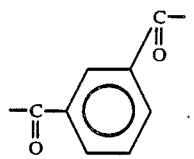

The copolyimide ester of the present invention may contain either one of them or both of them in a desired ratio.

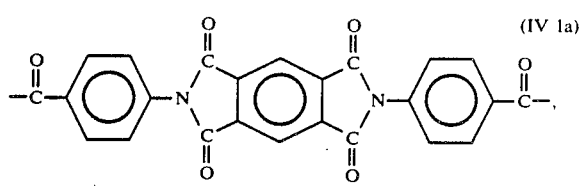
(IV la)

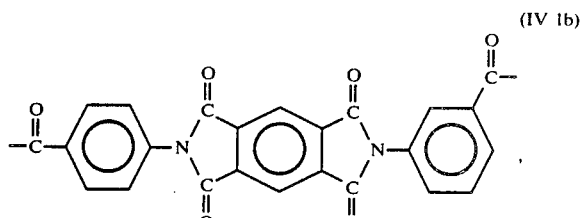
(IV lb)

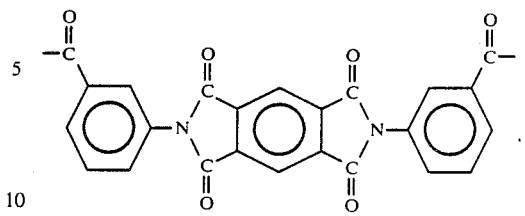
(IV lc)

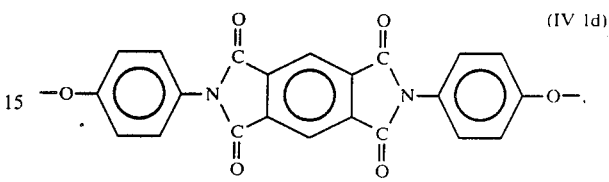
(IV ld)

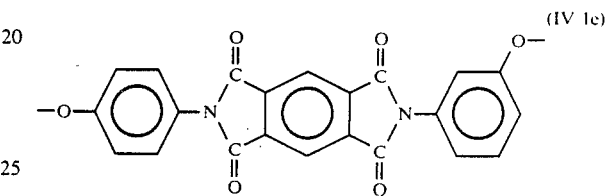
(IV le)

or

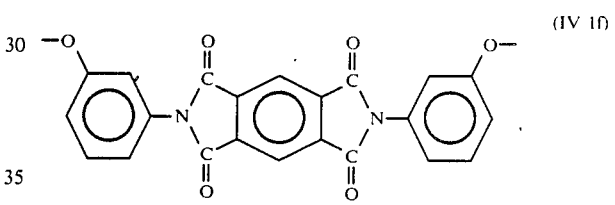
(IV lf)

The copolyimide ester of the present invention may contain either one of them or two or more of them in a desired ratio.

The copolyimide ester of the present invention has the melt viscosity of the above-described range. If the melt viscosity deviates the above-described range, the thermoplasticity will be insufficient for molding the obtained copolyimide ester easily by injection molding or the like, or the mechanical properties or heat resistance will become insufficient.

The examples of the preferred thermoplastic wholly aromatic copolyimide ester of the present invention include those consisting essentially of the recurring unit (I) represented by the following formula:

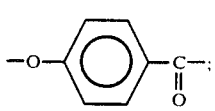
(I)

the recurring unit (II) represented by the following general formula:

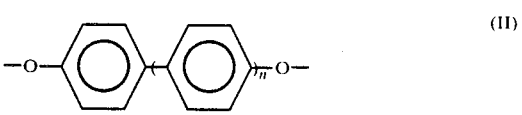
(II)

wherein n is as defined above; the recurring unit (III) represented by the following formula:

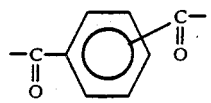
(III)

wherein the two carbonyl groups are present at para position or meta position of the benzene nucleus to each other; and the recurring unit (IV 1) represented by the following general formula;

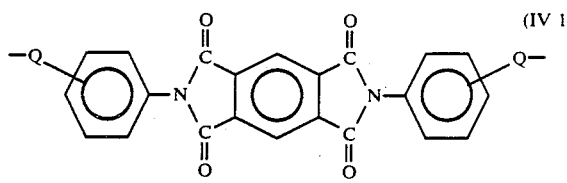
(IV 1)

wherein —Q— is as defined above; and wherein when —Q— is —CO—, then the mole ratio of (I)/[(II)+(III)+(IV 1)] is from (20/80) to (90/10), the mole ratio of (III)/(IV 1) is from (0.1/99.9) to (99.9/0.1), and the mole ratio of (II)/[(III)+(IV 1)] is from (10/11) to (11/10), and when —Q— is —O—, then the mole ratio of (I)/[(II)+(III)+(IV 1)] is from (20/80) to (90/10), the mole ratio of (II)/(IV 1) is from (0.1/99.9) to (99.9/0.1), and the mole ratio of (III)/[(II)+(IV 1)] is from (10/11) to (11/10).

The examples of the preferred thermoplastic wholly aromatic copolyimide ester of the present invention also include those consisting essentially of the recurring unit (I) represented by the following formula:

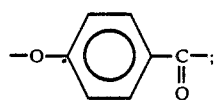
(I)

the recurring unit (II) represented by the following general formula:

(II)

wherein n is as defined above; the recurring unit (III) represented by the following formula:

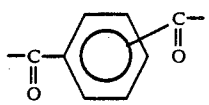
(III)

wherein the two carbonyl groups are present at para position or meta position of the benzene nucleus to each other; and the recurring unit (IV 2) represented by the following general formula;

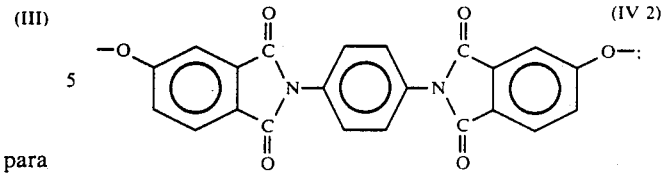
(IV 2)

and wherein the mole ratio of (I)/[(II)+(III)+(IV 2)] is from (20/80) to (90/10), the mole ratio of (II)/(IV 2) is from (0.1/99.9) to (99.9/0.1), and the mole ratio of (III)/[(II)+(IV 2)] is from (10/11) to (11/10).

If the ratios of the recurring units deviate from the ranges of the above-described mole ratios, it may sometimes become difficult to attain the desired dimensional stability or dimensional precision.

Although the method of producing the preferred thermoplastic wholly aromatic copolyimide esters of the present invention is not particularly limited, it is preferable to produce the copolymide esters containing the recurring unit (IV 1) by employing the processes of the present invention, which is particularly advantageouos in practical production. The processes of the present invention for producing the copolyimide esters containing the recurring unit (IV 1) comprise reacting at least three kinds of particular phenylene aromatic compounds with a particular pyromellitimide aromatic compound or with a pyromellitamide aromatic compound, which is a precursor of the former, in a particular ratio, to carry out polyester condensation thereof or imide-cyclization and polyester condensation thereof.

That is, the present invention provides a process for producing a thermoplastic wholly aromatic copolyimide ester consisting essentially of the recurring unit (I) represented by the following formula:

(I)

the recurring unit (II) represented by the following formula:

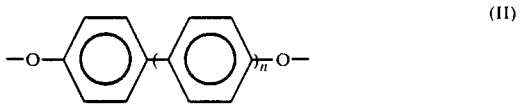
(II)

wherein n is as defined above; the recurring unit (III) represented by the following formula:

(III)

wherein the two carbonyl groups are present at para position or meta position of the benzene nucleus to each other; and the recurring unit (IV 1) represented by the following general formula:

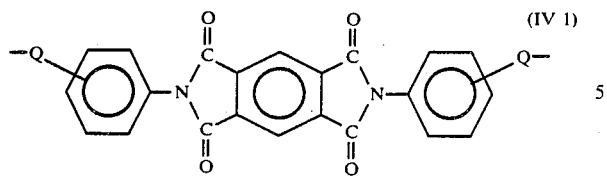

(IV 1)

wherein —Q— is as defined above; with the proviso that the recurring units (I), (II), (III), and (IV 1) are bonded to form ester bonds and that when —Q— is —CO—, then the mole ratio of (I)/[(II)+(III)+(IV 1)] is from (20/80) to (90/10), the mole ratio of (III)/(IV 1) is from (0.1/99.9) to (99.9/0.1), and the mole ratio of (II)/[(III)+(IV 1)] is from (10/11) to (11/10), and when —Q— is —O—, then the mole ratio of (I)/[(II)+(III)+(IV 1)] is from (20/80) to (90/10), the mole ratio of (II)/(IV 1) is from (0.1/99.9) to (99.9/0.1), and the mole ratio of (III)/[(II)+(IV 1)] is from (10/11) to (11/10); and the thermoplastic wholly aromatic copolyimide ester having a melt viscosity of from 1.0 to $1.0 \times 10^5$ Pa·s as measured at a shear stress of 0.025 Mpa and at a temperature of from 300° to 400° C.

which process comprises:
reacting a compound (I') represented by the following general formula:

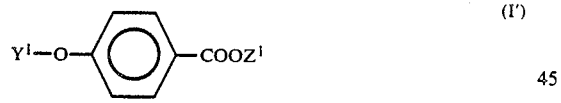

(I')

wherein
$Y^1$ is hydrogen atom or $R^1CO$—, $R^1$ being a hydrocarbon group of 1 to 18 carbon atoms, and
$Z^1$ is hydrogen atom or a hydrocarbon group of 1 to 18 carbon atoms;
a compound (II') represented by the following general formula:

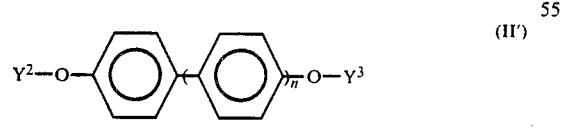

(II')

wherein
n is an integer of 0 or 1,
$Y^2$ is hydrogen atom or $R^2CO$—, and
$Y^3$ is hydrogen atom or $R^3CO$—,
$R^2$ and $R^3$ being independently a hydrocarbon group of 1 to 18 carbon atoms;
a compound (III') represented by the following general formula:

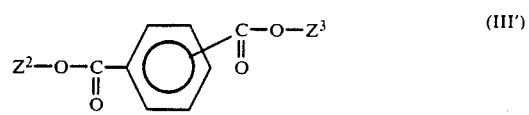

(III')

wherein $Z^2$ and $Z^3$ are independently hydrogen atom or a hydrocarbon group of 1 to 18 carbon atoms, and the

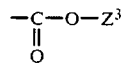

group is present at para position or meta position of the benzene nucleus to the

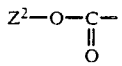

group;
and the compound (IV 1') represented by the following general formula:

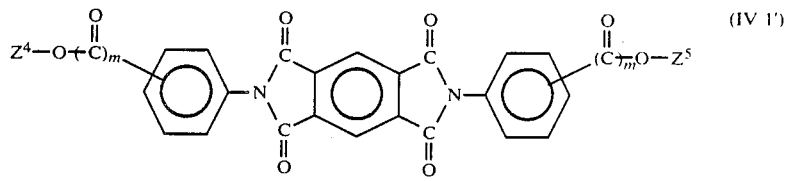

(IV 1')

wherein
m is an integer of 0 or 1,
$Z^4$ is, when m=0, hydrogen atom or $R^4$—CO—, $R^4$ being a hydrocarbon group of 1 to 18 carbon atoms or, when m=1, hydrogen atom or a hydrocarbon group of 1 to 18 carbon atoms,
$Z^5$ is, when m=0, hydrogen atom or $R^5$—CO—, $R^5$ being a hydrocarbon group of 1 to 18 carbon atoms or, when m=1, hydrogen atom or a hydrocarbon group of 1 to 18 carbon atoms,

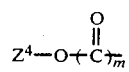

is present at para position or meta position of the benzene nucleus to the imide group, and

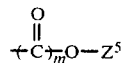

is present at para position or meta position of the benzene nucleus to the imide group;
in such amounts as satisfy, when m=1, a mole ratio of (I')/[(II')+(III')+(IV 1')] of from (20/80) to (90/10), a mole ratio of (III')/(IV 1') of from (0.1/99.9) to (99.9/0.1), and a mole ratio of (II')/[(III')+(IV 1')] of from (10/11) to (11/10) or, when m=0, a mole ratio of (I')/[(II')+(III')+(IV 1')] of from (20/80) to (90/10), a mole ratio of (II')/(IV 1') of from (0.1/99.9) to (99.9/0.1), and a mole ratio of (III')/[(II')+(IV 1')] of from (10/11) to (11/10), so that when m=1, then a compound (V') represented by the following general formula:

$$Y^p-O-Z^q \qquad (V')$$

wherein
$Y^p$ is $Y^1$, $Y^2$ or $Y^3$ and
$Z^q$ is $Z^1$, $Z^2$, $Z^3$, $Z^4$ or $Z^5$,
is eliminated,
or, when $m=0$, then a compound (VI') represented by the following general formula:

$$Y^p-O-Z^s \qquad (V2')$$

wherein
$Y^p$ is as defined above and
$Z^s$ is $Z^1$, $Z^2$ or $Z^3$,
and a compound (VII') represented by the following general formula:

$$Z^r-O-Z^s \qquad (VII')$$

wherein
$Z^s$ is as defined above and
$Z^r$ is $Z^4$ or $Z^5$,
are eliminated.

Also the present invention provides a process for producing a thermoplastic wholly aromatic copolyimide ester consisting essentially of the recurring unit (I) represented by the following formula:

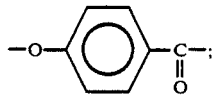
(I)

the recurring unit (II) represented by the following general formula:

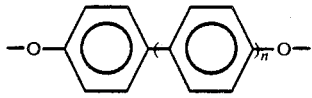
(II)

wherein n is as defined above; the recurring unit (III) represented by the following formula:

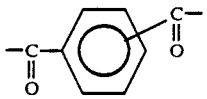
(III)

wherein the two carbonyl groups are present at para position or meta position of the benzene nucleus to each other; and the recurring unit (IV 1) represented by the following general formula:

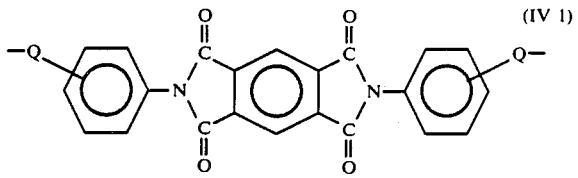
(IV 1)

wherein —Q— is as defined above; with the proviso that the recurring units (I), (II), (III), and (IV 1) are bonded to form ester bonds and that when —Q— is —CO—, then the mole ratio of (I)/[(II)+(III)+(IV 1)] is from (20/80) to (90/10), the mole ratio of (III)/(IV 1) is from (0.1/99.9) to (99.9/0.1), and the mole ratio of (II)/[(III)+(IV 1)] is from (10/11) to (11/10), and when —Q— is —O—, then the mole ratio of (I)/[(II)+(III)+(IV 1)] is from (20/80) to (90/10), and the mole ratio of (II)/(IV) is from (0.1/99.9) to (99.9/0.1), and the mole ratio of (III)/[(II)+(IV 1)] is from (10/11) to (11/10); and the thermoplastic wholly aromatic copolyimide ester having a melt viscosity of from 1.0 to $1.0 \times 10^5$ Pa·s as measured at a shear stress of 0.025 Mpa and at a temperature of from 300° to 400° C., which process comprises:

reacting a compound (I') represented by the following general formula:

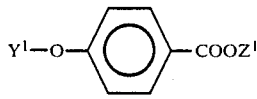
(I')

wherein $Y^1$ and $Z^1$ are as defined above;
a compound (II') represented by the following general formula:

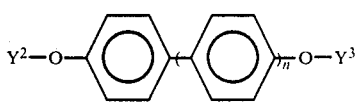
(II')

wherein n, $Y^2$, and $Y^3$ are as defined above;
a compound (III') represented by the following general formula:

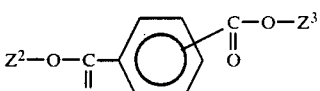
(III')

wherein $Z^2$ and $Z^3$,

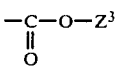

group, and

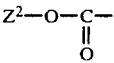

group are as defined above;
and a compound (IV 1″) represented by the following general formulas:

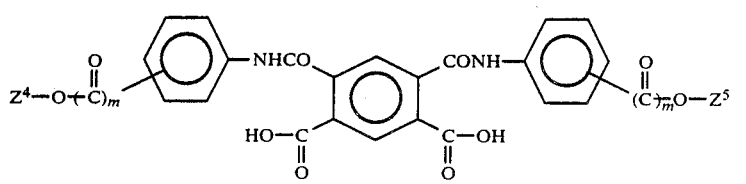
(IV1″ a)

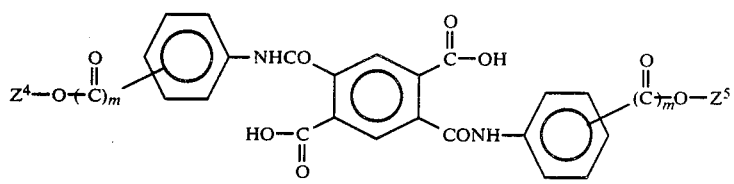
(IV1″ b)

wherein m, Z⁴, Z⁵,

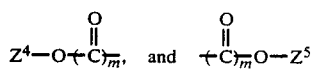

are as defined above; in such amounts as satisfy, when m=1, a mole ratio of (I′)/[(II′)+(III′)+(IV 1″)] of from (20/80) to (90/10), a mole ratio of (III′)/(IV 1″) of from (0.1/99.9) to (99.9/0.1), and a mole ratio of (II′)/[(III′)+(IV 1″)] of from (10/11) to (11/10) or, when m=0, a mole ratio of (I′)/[(II′)-+(III′)+(IV 1″)] of from (20/80) to (90/10), a mole ratio of (II′)/(IV 1″) of from (0.1/99.9) to (99.9/0.1), and a mole ratio of (III′)/[(II′)+(IV 1″)] of from (10/11) to (11/10), so that the compound (IV 1″) is imide-cyclized and, when m is 1, then a compound (V′) represented by the following general formula:

Y$^p$—O—Z$^q$ (V′)

wherein
Y$^p$ is Y¹, Y² or Y³ and
Z$^q$ is Z¹, Z², Z³, Z⁴ or Z⁵,
is eliminated,
or, when m is 0, then a compound (VI′) represented by the following general formula:

Y$^p$—O—Z$^s$ (VI′)

wherein
Y$^p$ is as defined above and
Z$^s$ is Z¹, Z² or Z³,
and a compound (VII′) represented by the following general formula:

Z$^r$—O—Z$^s$ (VII′)

wherein
Z$^s$ is as defined above and
Z$^r$ is Z⁴ or Z⁵,
are eliminated.

Also, it is preferable to produce the copolyimide esters containing the recurring unit (IV 2) by employing the processes of the present invention, which is particularly advantageous in practical production. The process of the present invention for producing the copolyimide esters containing the recurring unit (IV 2) comprises reacting at least three kinds of particular phenylene aromatic compounds and a particular phthalimide aromatic compound or phthalamide aromatic compound, which is a precursor of the former, in a particular ratio to carry out polyester condensation thereof or imide-cyclization and polyester condensation thereof.

That is, the present invention further provides a process for producing a thermoplastic wholly aromatic copolyimide ester consisting essentially of the recurring unit (I) represented by the following formula:

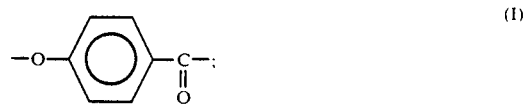
(I)

the recurring unit (II) represented by the following general formula:

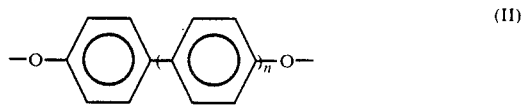
(II)

wherein n is as defined above; the recurring unit (III) represented by the following formula:

(III)

wherein the two carbonyl groups are present at para position or meta position of the benzene nucleus to each other; and the recurring unit (IV 2) represented by the following formula;

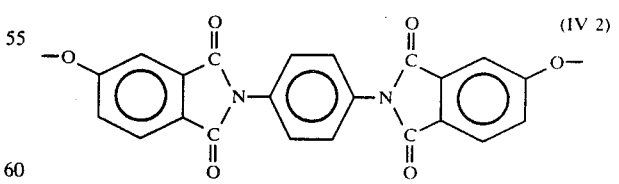
(IV 2)

with the proviso that the recurring units (I), (II), (III), and (IV 2) are bonded to form ester bonds and that the mole ratio of (I)/[(II)+(III)+(IV 2)] is from (20/80) to (90/10), the mole ratio of (II)/(IV 2) is from (0.1/99.9) to (99.9/0.1), and the mole ratio of (III)/[(II)+(IV 2)] is from (10/11) to (11/10); and the thermoplastic wholly aromatic copolyimide ester having a melt viscosity of from 1.0 to 1.0×10⁵ Pa·s as measured at a shear stress of 0.025 Mpa and at a temperature of from 300° to 400° C., which process comprises:

reacting a compound (I′) represented by the following general formula:

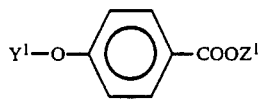
(I′)

wherein Y¹ and Z¹ are as defined above;
a compound (II′) represented by the following general formula:

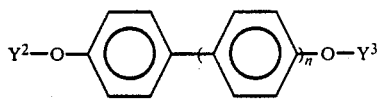
(II′)

wherein n, Y², and Y³ are as defined above;
a compound (III′) represented by the following general formula:

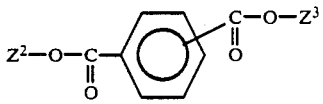
(III′)

wherein Z², Z³,

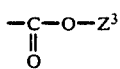

group, and

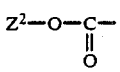

group are as defined above;
and the compound (IV 2′) represented by the following general formula:

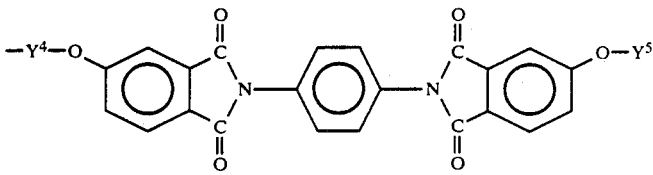
(IV 2′)

wherein
Y⁴ is hydrogen atom or R⁶—CO— and
Y⁵ is hydrogen atom or R⁷—CO—, R⁶ and R⁷ being independently a hydrocarbon group of 1 to 18 carbon atoms;
in such amounts as satisfy a mole ratio of (I′)/[(II′)+(III′)+(IV 2′)] of from (20/80) to (90/10), a mole ratio of (II′)/(IV 2′) of from (0.1/99.9) to (99.9/0.1), and a mole ratio of (III′)/[(II′)+(IV 2′)] of from (10/11) to (11/10).
so that a compound (VIII′) represented by the following general formula:

(VIII′)

wherein
Y^t is Y¹, Y², Y³, Y⁴ or Y⁵ and
Z^u is Z¹, Z² or Z³,
is eliminated.

Also, the present invention further provides a process for producing a thermoplastic wholly aromatic copolyimide ester consisting essentially of the recurring unit (I) represented by the following formula:

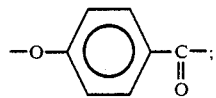
(I)

the recurring unit (II) represented by the following general formula:

(II)

wherein n is as defined above; the recurring unit (III) represented by the following formula:

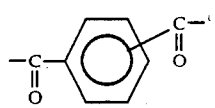
(III)

wherein the two carbonyl groups are present at para position or meta position of the benzene nucleus to each other; and the recurring unit (IV 2) represented by the following formula;

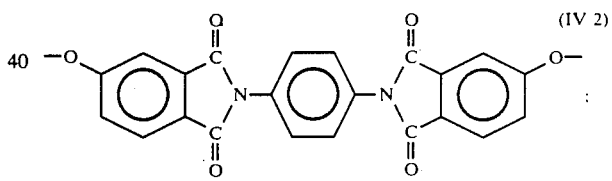
(IV 2)

with the proviso that the recurring units (I), (II), (III), and (IV 2) are bonded to form ester bonds and that the mole ratio of (I)/[(II)+(III)+(IV 2)] is from (20/80) to (90/10), the mole ratio of (II)/(IV 2) is from (0.1/99.9) to (99.9/0.1), and the mole ratio of (III)/[(II)+(IV 2)] is from (10/11) to (11/10); and the thermoplastic wholly aromatic copolyimide ester having a melt viscosity of from 1.0 to 1.0×10⁵ Pa·s as measured at a shear stress of 0.025 Mpa and at a temperature of from 300° to 400° C., which process comprises:

reacting a compound (I′) represented by the following general formula:

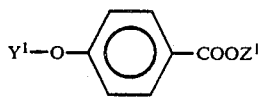

wherein $Y^1$ and $Z^1$ are as defined above; a compound (II') represented by the following general formula:

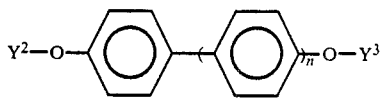

wherein n, $Y^2$, and $Y^3$ are as defined above;
a compound (III') represented by the following general formula:

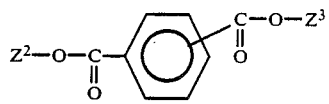

wherein $Z^2$, $Z^3$,

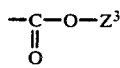

group, and

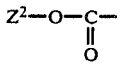

group are as defined above;
and a compound (IV 2″) represented by the following general formula:

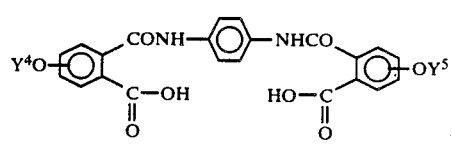

wherein
$Y^4$ and $Y^5$ are as defined above and
each $Y^4O-$ and $-OY^5$ is present at para position or meta position of the benzene nucleus respectively to the amido group;
in such amounts as satisfy a mole ratio of (I')/[(II')-+(III')+(IV 2″)] of from (20/80) to (90/10), a mole ratio of (II')/(IV 2″) of from (0.1/99.9) to (99.9/0.1), and a mole ratio of (III')/[(II')+(IV 2″)] of from (10/11) to (11/10), so that the compound (IV 2″) is imide-cyclized and a compound (VIII') represented by the following general formula:

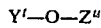 (VIII')

wherein
$Y^t$ is $Y^1$, $Y^2$, $Y^3$, $Y^4$ or $Y^5$ and
$Z^u$ is $Z^1$, $Z^2$ or $Z^3$,
is eliminated.

Hereinafter, the processes of the present invention will be described in detail.

The above-described $R^1$, $R^2$, $R^3$, $R^4$, $R^5$, $R^6$, and $R^7$ are independently a hydrocarbon group of 1 to 18 carbon atoms, and some illustrative examples of the hydrocarbon group include alkyl groups such as methyl, ethyl, n-propyl, isopropyl, n-butyl, sec-butyl, tert-butyl, pentyl, isopentyl, neopentyl, heptyl, isoctyl, nonyl, decyl, pentadecyl, and heptadecyl, cycloalkyl groups such as cyclopentyl and cyclohexyl, aryl or aralkyl groups such as phenyl, tolyl, naphthyl, and benzyl. Among these, the particularly preferred is methyl group.

$R^1$, $R^2$, $R^3$, $R^4$, and $R^5$ may be identical with each other or may include some being identical with each other and the others being different from each other, or all of them may be different from each other. The same may be said of $R^1$, $R^2$, $R^3$, $R^6$, and $R^7$.

The above-described $Z^1$, $Z^2$, and $Z^3$ are independently hydrogen atom or a hydrocarbon group of 1 to 18 carbon atoms, and some illustrative examples of the hydrocarbon group include the same hydrocarbon groups as described above. The particularly preferred are hydrogen atom, methyl, etc. $Z^1$, $Z^2$, and $Z^3$ may be identical with each other or may include some different groups, or all of them may be different from each other.

$Z^4$ and $Z^5$ are hydrogen atom or a hydrocarbon group of 1 to 18 carbon atoms when m is an integer of 1, and some illustrative examples of the hydrocarbon group include the same hydrocarbon groups as listed above. The particularly preferred are hydrogen atom and methyl group.

The examples of the compound (I') include 4-hydroxybenzoic acid, 4-acyloxybenzoic acids prepared by acylating 4-hydroxybenzoic acid with $R^1COOH$ or a derivative thereof ($R^1$ is as defined above.), and 4-hydroxybenzoic esters prepared respectively by esterifying 4-hydroxybenzoic acid or the acyloxybenzoic acids with $Z^1OH$ ($Z^1$ is as defined above.).

Some illustrative examples of the compound (I') include 4-hydroxybenzoic acid, 4-hydroxybenzoic esters such as methyl 4-hydroxybenzoate, ethyl 4-hydroxybenzoate, propyl 4-hydroxybenzoate, butyl 4-hydroxybenzoate, and benzyl 4-hydroxybenzoate, 4-acyloxybenzoic acids such as 4-acetoxybenzoic acid and 4-benzoyloxybenzoic acid, and 4-acyloxybenzoic esters such as methyl 4-acetoxybenzoate, butyl 4-acetoxybenzoate, and benzyl 4-acetoxybenzoate.

Among these, the preferred examples include 4-hydroxybenzoic acid, methyl 4-hydroxybenzoate, 4-acetoxybenzoic acid, and methyl 4-acetoxybenzoate, and the particularly preferred examples include 4-hydroxybenzoic acid and 4-acetoxybenzoic acid.

These compounds may be used individually or in a combination of two or more of them.

The examples of the compound (II') include hydroquinone, 4,4'-dihydroxybiphenyl, and the compounds prepared by acylating each of them with $R^2COOH$, $R^3COOH$ ($R^2$ and $R^3$ are as defined above.) or a derivative thereof.

Some illustrative examples of the compound (II') include hydroquinone, 4-acyloxyphenols such as 4-acetoxyphenol, 4-benzoyloxyphenol, and 4-propionyloxyphenol, 1,4-diacyloxybenzenes such as 1,4-diacetoxybenzene, 4,4'-dihydroxybiphenyl, 4'-acyloxy-4-hydroxybiphenyls such as 4'-acetoxy-4-hydroxybiphenyl, and 4,4'-diacyloxybiphenyls such as 4,4'- diacetoxybiphenyl. Among these, the preferred examples include hydroquinone, 4-acetoxyphenol, 1,4-diacetoxybenzene, 4,4'-dihydroxybiphenyl, 4'-acetoxy-4-hydroxybiphenyl, and 4,4'-diacetoxybiphenyl. The particularly preferred examples include hydroquinone, 4,4'-dihydroxybiphenyl, and 4,4'-diacetoxybiphenyl.

These compounds may be used individually or in a combination of two or more of them.

The examples of the compound (III') include terephthalic acid, isophthalic acid, and the compounds prepared by esterifying each of them with $Z^2OH$ or $Z^3OH$ ($Z^2$ and $Z^3$ are as defined above.).

Some illustrative examples of the compound (III') include terephthalic acid, isophthalic acid, terephthalic monoesters such as monomethyl terephthalate, monoethyl terephthalate, monopropyl terephthalate, monobutyl terephthalate, monohexyl terephthalate, and monobenzyl terephthalate, terephthalic diesters such as dimethyl terephthalate and diethyl terephthalate, isophthalic monoesters such as monomethyl isophthalate, monoethyl isophthalate, monopropyl isophthalate, monobutyl isophthalate, monohexyl isophthalate, monooctyl isophthalate, monodecyl isophthalate, and monobenzyl isophthalate, isophthalic diesters such as dimethyl isophthalate, diethyl isophthalate, and dibutyl isophthalate. Among these, the preferred examples include terephthalic acid, dimethyl terephthalate, isophthalic acid, and dimethyl isophthalate. The particularly preferred examples include terephthalic acid and isophthalic acid.

These compounds may be used individually or in a combination of two or more of them.

Among the examples of the compound (IV 1'), the examples of the compound (IV 1') wherein m is 1 include N,N'-bis(4-carboxyphenyl)pyromellitimide;

N-(4-carboxyphenyl or 4-alkoxycarbonylphenyl)-N'-(4-carboxyphenyl or 4-alkoxycarbonylphenyl)pyromellitimide, such as N,N'-bis(4-methoxycarbonylphenyl)pyromellitimide, N,N'-bis(4-ethoxycarbonylphenyl)pyromellitimide, and N-(4-carboxyphenyl)-N'-(4-methoxycarbonylphenyl)pyromellitimide;

N-(3-carboxyphenyl or 3-alkoxycarbonylphenyl)-N'-(3-carboxyphenyl or 3-alkoxycarbonylphenyl)pyromellitimide, such as N,N'-bis(3-carboxyphenyl)pyromellitimide, N,N'-bis(3-methoxycarbonylphenyl)pyromellitimide, and N-(3-carboxyphenyl)-N'-(3-methoxycarbonylphenyl)pyromellitimide;

and N-(4-carboxyphenyl or alkoxycarbonylphenyl)-N'-(3-carboxyphenyl or alkoxycarbonylphenyl)pyromellitimide, such as N-(4-carboxyphenyl)-N'-(3-carboxyphenyl)pyromellitimide, N-(4-methoxycarbonylphenyl)-N'-(3-methoxycarbonylphenyl)pyromellitimide, and N-(4-carboxyphenyl)-N'-(3-methoxycarbonylphenyl)pyromellitimide, and the examples of the compound (IV 1') wherein m is 0 include N-(4-hydroxyphenyl or 4-acyloxyphenyl)-N'-(4-hydroxyphenyl or 4-acyloxyphenyl)pyromellitimide, such as N,N'-bis(4-hydroxyphenyl)pyromellitimide, N,N'-bis(4-acetoxyphenyl)pyromellitimide, N,N'-bis(4-propionyloxyphenyl)pyromellitimide, N,N'-bis(4-benzoyloxyphenyl)pyromellitimide, and N-(4-hydroxyphenyl)-N'-(4-acetoxyphenyl)pyromellitimide;

N-(3-hydroxyphenyl or 3-acyloxyphenyl)-N'-(3-hydroxyphenyl or 3-acyloxyphenyl)pyromellitimide, such as N,N'-bis(3-hydroxyphenyl)pyromellitimide, N,N'-bis(3-acetoxyphenyl)pyromellitimide, and N-(3-hydroxyphenyl)-N'-(3-acetoxyphenyl)pyromellitimide;

and N-(4-hydroxyphenyl or 4-acyloxyphenyl)-N'-(3-hydroxyphenyl or 3-acyloxyphenyl)pyromellitimide, such as N-(4-hydroxyphenyl)-N'-(3-hydroxyphenyl)-pyromellitimide, N-(4-acetoxyphenyl)-N'-(3-acetoxyphenyl)pyromellitimide, and N-(4-hydroxyphenyl)-N'-(3-acetoxyphenyl)pyromellitimide.

Among these, the preferred examples include
N,N'-bis(4-carboxyphenyl)pyromellitimide,
N,N'-bis(3-carboxyphenyl)pyromellitimide,
N,N'-bis(4-hydroxyphenyl)pyromellitimide, and
N,N'-bis(3-hydroxyphenyl)pyromellitimide.
The particularly preferred examples include N,N'-bis(4-carboxyphenyl)pyromellitimide and
N,N'-bis(4-hydroxyphenyl)pyromellitimide.

These compounds may be used individually or in a combination of two or more of them.

Among the examples of the compound (IV 1''), some illustrative examples of the compound (IV 1'') wherein m is 1 include 4,6-bis(4-carboxyphenylaminocarbonyl)benzene-1,3-dicarboxylic acid,
4,6-bis(3-carboxyphenylaminocarbonyl)benzene-1,3-dicarboxylic acid,
4,6-bis(4-methoxycarbonylphenylaminocarbonyl)benzene-1,3-dicarboxylic acid,
4,6-bis(3-methoxycarbonylphenylaminocarbonyl)benzene-1,3-dicarboxylic acid,
4-(4-carboxyphenylaminocarbonyl)-6-(3-carboxyphenylaminocarbonyl)benzene-1,3-dicarboxylic acid,
2,5-bis(4-carboxyphenylaminocarbonyl)benzene-1,4-dicarboxylic acid,
2,5-bis(3-carboxyphenylaminocarbonyl)benzene-1,4-dicarboxylic acid,
2,5-bis(4-methoxycarbonylphenylaminocarbonyl)benzene-1,4-dicarboxylic acid, and
2-(3-carboxyphenylaminocarbonyl)-5-(4-carboxyphenylaminocarbonyl)benzene-1,4-dicarboxylic acid, and some illustrative examples of the compound (IV 1'') wherein m is 0 include 4,6-bis(4-hydroxyphenylaminocarbonyl)benzene-1,3-dicarboxylic acid,
4,6-bis(3-hydroxyphenylaminocarbonyl)benzene-1,3-dicarboxylic acid,
4,6-bis(4-acetoxyphenylaminocarbonyl)benzene-1,3-dicarboxylic acid,
4,6-bis(3-acetoxyphenylaminocarbonyl)benzene-1,3-dicarboxylic acid,
4-(4-hydroxyphenylaminocarbonyl)-6-(3-hydroxyphenylaminocarbonyl)benzene-1,3-dicarboxylic acid,
2,5-bis(4-hydroxyphenylaminocarbonyl)benzene-1,4-dicarboxylic acid,
2,5-bis(3-hydroxyphenylaminocarbonyl)benzene-1,4-dicarboxylic acid,
2,5-bis(4-acetoxyphenylaminocarbonyl)benzene-1,4-dicarboxylic acid, and
2-(3-hydroxyphenylaminocarbonyl)-5-(4-hydroxyphenylaminocarbonyl)benzene-1,4-dicarboxylic acid.

Among these, the particularly preferred examples include 4,6-bis(4-carboxyphenylaminocarbonyl)benzene-1,3-dicarboxylic acid, 4,6-bis(4-hydroxyphenylaminocarbonyl)benzene-1,3-dicarboxylic acid, 2,5-bis(4-carboxyphenylaminocarbonyl)benzene-1,4-dicarboxylic acid, and 2,5-bis(4-hydroxyphenylaminocarbonyl)benzene-1,4-dicarboxylic acid.

These compounds may be used individually or in a form of a mixture of two or more of them.

The above-described compound (IV 1'') may be synthesized, for example, by the reaction of a compound (A) (pyromellitic anhydride) represented by the following formula:

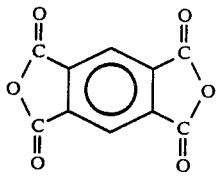
(A)

with at least one compound (B) (p- or m-aminobenzoic acid or an ester thereof, or p- or m-aminophenol or p- or m-acyloxyaniline) represented by the following general formula:

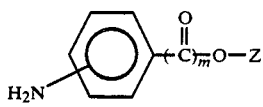
(B)

wherein
m is as difined above,
Z bears the same meaning as the above-described $Z^4$ or $Z^5$, and
the amino group is present at para or meta position of the benzene nucleus to

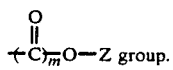 group.

When the above method is employed for the synthesis of the compound (IV 1''), the synthesized compound (IV 1'') will be generally a mixture of the compound represented by the general formula (IV1''a) and the compound represented by the general formula (IV1''b).

The compound (IV 1') may be prepared, for example, by the dehydration-cyclization (imide-cyclization) of the compound (IV 1'') synthesized by the above method.

Also, the compound (IV 1'') may be prepared by the hydrolysis of the compound (IV 1').

The reaction of the compound (A) with the compound (B) easily proceeds merely by mixing both compounds, preferably in a molten state, forming a nonsoluble amide acid, i.e. the compound (IV 1''), which generally precipitates. Though the reaction proceeds efficiently at room temperature, the preferable reaction temperature ranges from $-50°$ C. to $100°$ C., and, in many cases, temperatures of $0°$ to $80°$ C. are suitable for the reaction. The reaction proceeds quickly and generally requires no particular catalyst.

The dehydration-cyclization of the compound (IV 1'') may be carried out by various methods. Some illustrative examples of the methods include (1) a dehydration-cyclization in the presence of a carboxylic anhydride, (2) a dehydration-cyclization using an inorganic acid or a condensation product thereof having dehydrating function, (3) azeotropic dehydration-cyclization in the presence of an acid catalyst, (4) cyclization using a specific dehydration agent, and (5) dehydration-cyclization by heating.

Among the compounds (IV 1'), those wherein $Z^4$ and $Z^5$ are groups other than hydrogen atom may be prepared by a reaction using the raw material compounds (IV 1'') each having the corresponding substituent, or may be derived from the compounds (IV 1') wherein $Z^4$ and $Z^5$ are hydrogen atom.

When all of the groups $Y^1$, $Y^2$, $Y^3$, $Z^1$, $Z^2$, $Z^3$, $Z^4$, and $Z^5$ in the compounds (I'), (II'), (III'), and (IV 1') are groups other than hydrogen atom, such compounds may be synthesized individually or simultaneously.

The examples of the compound (IV 2'') include the compounds represented by the following general formulas.

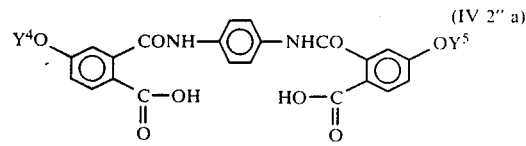
(IV 2'' a)

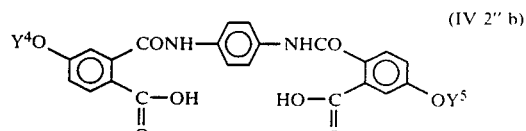
(IV 2'' b)

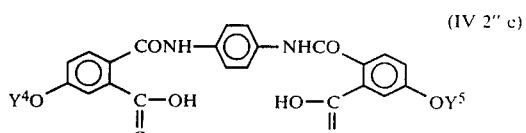
(IV 2'' c)

These may be used individualy or in a combination of two or more of them.

For example, the phthalimide compound (IV 2') may be prepared by reacting a derivative of hydroxyphthalic acid represented by the following general formula:

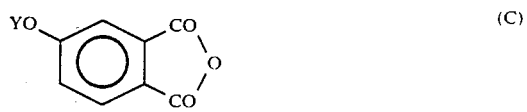
(C)

wherein Y is $Y^4$ or $Y^5$, and $Y^4$ and $Y^5$ are as defined above and generally are identical with each other, with p-phenylenediamine represented by the following formula:

(D)

to form the amide acids represented by the above general formulas (IV 2'' a), (IV 2'' b) or (IV 2'' c), followed by dehydrating and cyclizing the obtained amide acids.

The reaction of the compound (C) with p-phenylenediamine easily proceeds merely by mixing both the compounds, preferably in a molten state, forming a nonsoluble amide acid which generally precipitates. Though the reaction proceeds efficiently at room temperature, the preferable reaction temperature ranges from −50° C. to 100° C., and in many cases, temperatures of 0° to 80° C. are suitable for the reaction. The reaction proceeds quickly and generally requires no particular catalyst.

The dehydration-cyclization of the amide acids represented by the formulas (IV 2″ a) (IV 2″ b), and (IV 2″c) may be carried out by various methods. Some illustrative examples of the methods include those described as the examples of the dehydration-cyclization methods for the compound (IV 1″).

Among the compounds (IV 2′), those wherein $Y^4$ and $Y^5$ are groups other than hydrogen atom may be prepared by a reaction using the raw material compounds (IV 2″) each having the corresponding substituent, or may be derived from the compounds (IV 2′) wherein $Y^4$ and $Y^5$ are hydrogen atom.

When all of the groups $Y^1$, $Y^2$, $Y^3$, $Y^4$, $Y^5$, $Z^1$, $Z^2$, and $Z^3$ in the compounds (I′), (II′), (III′), and (IV 2′) are groups other than hydrogen atom, such compounds may be synthesized individually or simultaneously.

The reaction of the above-described compounds (I′), (II′), (III′), and (IV 1′) or (IV 2′) is carried out generally at 200° to 400° C., preferably 230° to 370° C., generally at atmospheric pressure or below, and in the latter half of the reaction, preferably at a vacuum of 300 to 0.01 Torr. The reaction time varies generally from several minutes to tens of hours depending upon the objective melt viscosity of the polymer. In order to prevent the degradation of the polymer at the reaction temperature, it is preferable to restrict the reaction time to from minutes to hours.

Though catalyst is not particularly necessary for the above-described reaction, a proper polycondensation catalyst such as antimony oxide and germanium oxide may be used.

Concerning the addition of the reaction materials, all of them may be mixed together from the beginning of the reaction, or each reaction material may be added at a separate reaction stage. For example, the compound (I′) may be added after the mixture of the compounds (II′), (III′), and (IV 1′) or (IV 2′) has been reacted to same degree. Such separation in the addition of the reaction materials makes it easier to control the distribution of the components of the copolyimide ester, from random copolyester to block copolyester.

The reaction is conducted as described above and is concluded by eliminating at least the compound (V′) (when m is 1), or the compound (VI′) and the compound (VII′) (when m is 0), or the compound (VIII′).

The reaction of the compounds (I′), (II′), (III′), and (IV 1″) or (IV 2″) may be carried out by the similar procedure to the reaction of the compounds (I′), (II′), (III′), and (IV 1′) or (IV 2′) with the exception that the compounds (IV 1′) or (IV 2′) are replaced by the compounds (IV 1″) or (IV 2″) and imide-cyclization is further carried out.

Though the reaction described above is generally carried out without particular solvent, a suitable solvent may also be used if desired.

Thus, the copolyimide ester of the present invention can be prepared. The obtained polymer, if necessary, may be further subjected to after-treatments, such as a known purification, to collect it as a polymer of a desired purity.

The copolyimide ester of the present invention can be suitably produced by the above procedure.

The copolyimide ester of the present invention may be injection-molded at general molding temperatures (not higher than 400° C.) and, also, may be molded by any molding technique employed for molding common thermoplastic resins, such as extrution molding, compression molding, and spinning. Further, the obtained molds may be heat treated at an appropriate temperature for an appropriate time. The copolyimide ester of the present invention is, therefore, a novel thermoplastic polymer which has excellent dimensional stability and dimensional precision in both MD and TD and, as well, excels in heat resistance, mechanical properties, etc. Accordingly, the copolyimide ester of the present invention is useful as materials in various fields, for example, as the material for precision-injection molded parts such as electric or electronic parts which require heat resistance and dimensional precision, filament, film, or sheet.

EXAMPLES 1 TO 22 AND COMPARATIVE EXAMPLES 1 TO 5

Synthetic Example 1

(1) Synthesis of N,N′-bis(4-carboxyphenyl)pyromellitimide

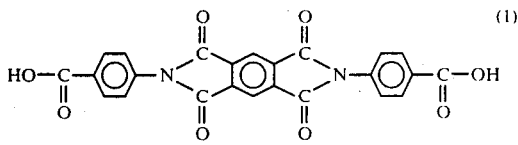

39.3 g (0.18 mol) of pyromellitic anhydride and 49.4 g (0.36 mol) of p-aminobenzoic acid were dissolved in 200 ml of dimethylformamide (DMF), and DMF was then refluxed. Directly after beginning the reflux, yellow, powdery crystals started to precipitate. After 2.5 hours of reflux, the reaction mixture was cooled. After filtration of the reaction product, the obtained crystals were washed with successive, DMF and acetone, and were dried to obtain the objective imide (1).

The results of the elementary analysis of the obtained polymer were as follows:

|  | C | H | N |
| --- | --- | --- | --- |
| Theoretical value (%) | 63.2 | 2.65 | 6.14 |
| Measured value (%) | 63.3 | 2.61 | 6.17 |

(2) Synthesis of N,N′-bis(4-hydroxyphenyl)pyromellitimide

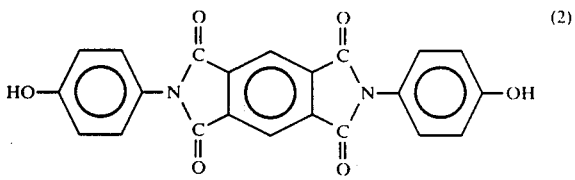

39.3 g (0.18 mol) of pyromellitic anhydride and 39.3 g (0.36 mol) of p-aminophenol were dissolved in 200 ml of dimethylformamide (DMF), and DMF was then refluxed. Directly after beginning the reflux, yellow, platy crystals started to precipitate. After 2.5 hours of reflux, the reaction mixture was cooled. After filtration of the reaction product, the obtained crystals were washed with successive, DMF and acetone, and were dried to obtain the objective imide (2).

The results of the elementary analysis of the obtained polymer were as follows:

|  | C | H | N |
|---|---|---|---|
| Theoretical value (%) | 66.0 | 3.02 | 7.00 |
| Measured value (%) | 66.1 | 3.08 | 6.97 |

Example 1

Into a 500 ml separable flask were placed
0.072 mol (9.860 g) of p-aminobenzoic acid,
0.036 mol (7.850 g) of pyromellitic anhydride, and
100 ml of methyl ethyl ketone,
and the mixture was stirred for one hour at room temperature, to form the precipitate of the amide acid (3) and amide acid (4) represented respectively by the following structural formulas:

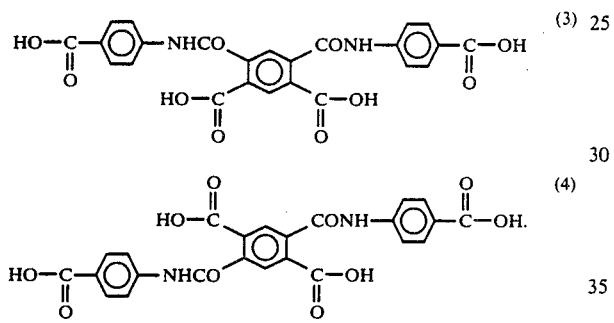

Into the flask were subsequently added
0.600 mol (82.90 g) of p-hydroxybenzoic acid,
0.180 mol (33.52 g) of 4,4'-dihydroxybiphenyl,
0.120 mol (13.21 g) of hydroquinone,
0.204 mol (33.89 g) of terephthalic acid,
0.060 mol (9.968 g) of isophthalic acid, and
1.200 mol (112.8 ml) of acetic anhydride.
After the mixture was heated to 150° C. with stirring in a stream of nitrogen, acetic anhydride was refluxed for one hour. Subsequently, the temperature was raised to 360° C. in 90 minutes, and the dehydration-cyclization of the amide acids and polymerization were carried out, while distilling methyl ethyl ketone, water, and acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 71.78 | 3.44 | 0.60 |
| Measured value (%) | 71.75 | 3.41 | 0.61 |

From these results, the polymer was identified to be a copolyimide ester having the structural units and the composition represented by the following formulas.

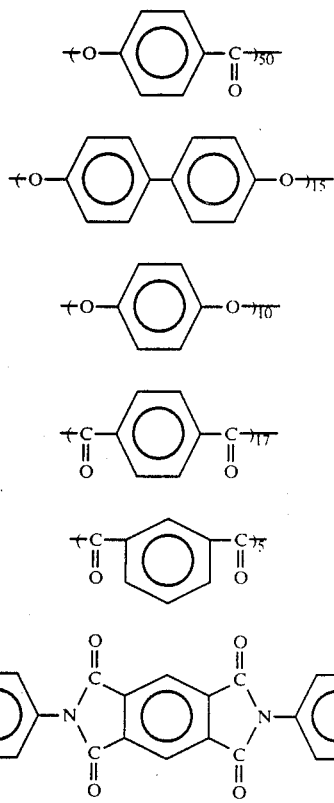

The melt viscosity of the polymer was measured with a Koka-type flow tester (SHIMAZU FLOW TESTER, CFT-500) using a dies of 1.0 mm in diameter and of $L/D=10$, at a extrusion pressure of 10 kgf/cm² and at a temperature raising rate of 5° C. /min. The polymer had a melt viscosity of 130 Pa·s at 380° C.

The polymer exhibited optical anisotropy even in molten state. The observation of the optical anisotropy was conducted with a polarizing microscope produced by Nikon Co., Ltd. equipped with a hot stage produced by Lincam Co., Ltd.

The coefficient of linear expansion, coefficient of mold shrinkage, flexural strength, flexural modulus, and heat distortion temperature of the polymer were measured according to the methods described later. The results are shown in the Table 1.

Example 2

Into a 500 ml separable flask were placed
0.024 mol (3.291 g) of p-aminobenzoic acid,
0.012 mol (2.617 g) of pyromellitic anhydride, and
100 ml of methyl ethyl ketone,
and the mixture was stirred for one hour at room temperature, to form the precipitate of the same amide acid (3) and amide acid (4) as those obtained in Example 1.

Into the flask were subsequently added
0.720 mol (99.45 g) of p-hydroxybenzoic acid,
0.240 mol (44.69 g) of 4,4'-dihydroxybiphenyl,
0.168 mol (27.91 g) of terephthalic acid,
0.060 mol (9.968 g) of isophthalic acid, and
1.200 mol (112.8 ml) of acetic anhydride.
After the mixture was heated to 150° C. with stirring in a stream of nitrogen, acetic anhydride was refluxed for one hour. Subsequently, the temperature was raised to 360° C. in 90 minutes, and the dehydration-cyclization of the amide acids and polymerization were carried out, while distilling methyl ethyl ketone, water, and acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 72.64 | 3.54 | 0.20 |
| Measured value (%) | 72.61 | 3.55 | 0.21 |

From these results, the polymer was identified to be a copolyimide ester having the structural units and the composition represented by the following formulas.

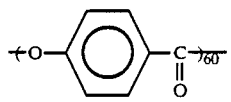

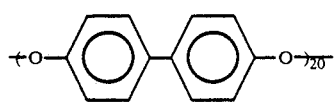

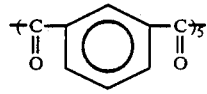

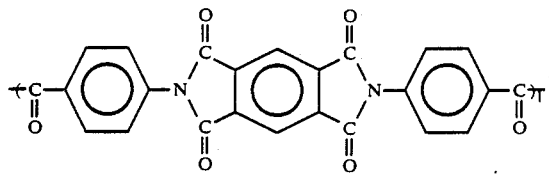

The melt viscosity of the polymer was measured by the same method as Example 1 to be 75 Pa·s at 380° C.

The polymer exhibited optical anisotropy in molten state.

The coefficient of linear expansion, coefficient of mold shrinkage, flexural strength, flexural modulus, and heat distortion temperature of the polymer were measured according to the methods described later. The results are shown in the Table 1.

EXAMPLE 3

Into a 500 ml separable flask were placed
0.072 mol (9.860 g) of p-aminobenzoic acid,
0.036 mol (7.850 g) of pyromellitic anhydride, and
100 ml of methyl ethyl ketone,
and the mixture was stirred for one hour at room temperature, to form the precipitate of the same amide acid (3) and amide acid (4) as those obtained in Example 1.

Into the flask were subsequently added
0.720 mol (99.45 g) of p-hydroxybenzoic acid,
0.240 mol (44.69 g) of 4,4'-dihydroxybiphenyl,
0.144 mol (23.92 g) of terephthalic acid,
0.060 mol (9.968 g) of isophthalic acid, and
1.200 mol (112.8 ml) of acetic anhydride.

After the mixture was heated to 150° C. with stirring in a stream of nitrogen, acetic anhydride was refluxed for one hour. Subsequently, the temperature was raised to 360° C. in 90 minutes, and the dehydration-cyclization of the amide acids and polymerization were carried out, while distilling methyl ethyl ketone, water, and acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 72.38 | 3.49 | 0.58 |
| Measured value (%) | 72.37 | 3.45 | 0.56 |

The infrared spectrum of the obtained polymer is shown in FIG. 1.

From these results, the polymer was identified to be a copolyimide ester having the structural units and the composition represented by the following formulas.

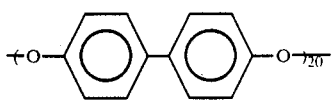

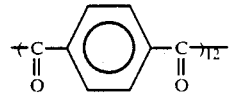

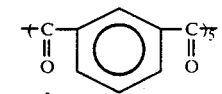

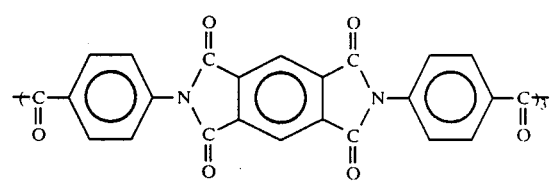

The melt viscosity of the polymer was measured by the same method as Example 1 to be 240 Pa·s at 390° C.

The polymer exhibited optical anisotropy in molten state.

The coefficient of linear expansion, coefficient of mold shrinkage, flexural strength, flexural modulus, and heat distortion temperature of the polymer were measured according to the methods described later. The results are shown in the Table 1.

EXAMPLE 4

Into a 500 ml separable flask were placed 0.240 mol (32.91 g) of p-aminobenzoic acid,
0.120 mol (26.17 g) of pyromellitic anhydride, and
100 ml of methyl ethyl ketone,
and the mixture was stirred for one hour at room temperature, to form the precipitate of the same amide acid (3) and amide acid (4) as those obtained in Example 1.

Into the flask were subsequently added
0.720 mol (99.45 g) of p-hydroxybenzoic acid,
0.240 mol (44.69 g) of 4,4'-dihydroxybiphenyl,
0.120 mol (19.94 g) of isophthalic acid, and
1.200 mol (112.8 ml) of acetic anhydride.

After the mixture was heated to 150° C. with stirring in a stream of nitrogen, acetic anhydride was refluxed for one hour. Subsequently, the temperature was raised to 360° C. in 90 minutes, and the dehydration-cyclization of the amide acids and polymerization were carried out, while distilling methyl ethyl ketone, water, and acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 71.62 | 3.31 | 1.70 |
| Measured value (%) | 71.60 | 3.33 | 1.71 |

From these results, the polymer was identified to be a copolyimide ester having the structural units and the composition represented by the following formulas.

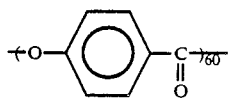

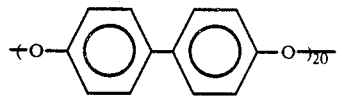

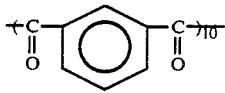

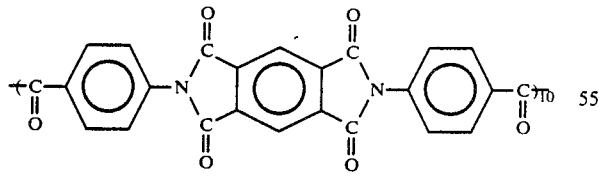

The melt viscosity of the polymer was measured by the same method as Example 1 to be 150 Pa·s at 320° C.

The polymer exhibited optical anisotropy in molten state.

The coefficient of linear expansion, coefficient of mold shrinkage, flexural strength, flexural modulus, and heat distortion temperature of the polymer were measured according to the methods described later. The results are shown in the Table 1.

EXAMPLE 5

Into a 500 ml separable flask were placed
0.072 mol (9.860 g) of p-aminobenzoic acid,
0.036 mol (7.850 g) of pyromellitic anhydride, and
100 ml of methyl ethyl ketone.

and the mixture was stirred for one hour at room temperature, to form the precipitate of the same amide acid (3) and amide acid (4) as those obtained in Example 1.

Into the flask were subsequently added
0.840 mol (116.0 g) of p-hydroxybenzoic acid,
0.180 mol (33.52 g) of 4,4'-dihydroxybiphenyl,
0.084 mol (13.95 g) of terephthalic acid,
0.060 mol (9.968 g) of isophthalic acid, and
1.200 mol (112.8 ml) of acetic anhydride.

After the mixture was heated to 150° C. with stirring in a stream of nitrogen, acetic anhydride was refluxed for one hour. Subsequently, the temperature was raised to 360° C. in 90 minutes, and the dehydration-cyclization of the amide acids and polymerization were carried out, while distilling methyl ethyl ketone, water, and acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 71.78 | 3.44 | 0.60 |
| Measured value (%) | 71.75 | 3.43 | 0.61 |

From these results, the polymer was identified to be a copolyimide ester having the structural units and the composition represented by the following formulas.

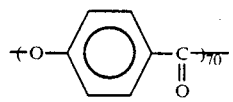

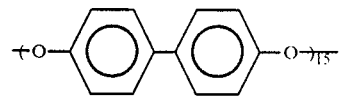

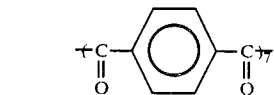

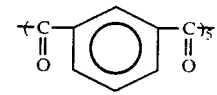

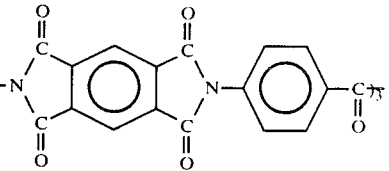

The melt viscosity of the polymer was measured by the same method as Example 1 to be 215 Pa·s at 380° C.

The polymer exhibited optical anisotropy in molten state.

The coefficient of linear expansion, coefficient of mold shrinkage, flexural strength, flexural modulus, and heat distortion temperature of the polymer were measured according to the methods described later. The results are shown in the Table 1.

Example 6

Into a 500 ml separable flask were placed
0.720 mol (99.45 g) of p-hydroxybenzoic acid,
0.240 mol (44.69 g) of 4,4'-dihydroxybiphenyl,
0.144 mol (23.92 g) of terephthalic acid,
0.060 mol (9.968 g) of isophthalic acid,
0.036 mol (16.43 g) of N,N'-bis(4-carboxyphenyl)-pyromellitimide, and
1.200 mol (112.8 ml) of acetic anhydride.

After the mixture was heated to 150° C. with stirring in a stream of nitrogen, acetic anhydride was refluxed for one hour. Subsequently, the temperature was raised to 360° C. in 90 minutes, and polymerization was then carried out, while distilling acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 72.38 | 3.49 | 0.58 |
| Measured value (%) | 72.36 | 3.47 | 0.59 |

From these results, the polymer was identified to be a copolyimide ester having the structural units and the composition represented by the following formulas.

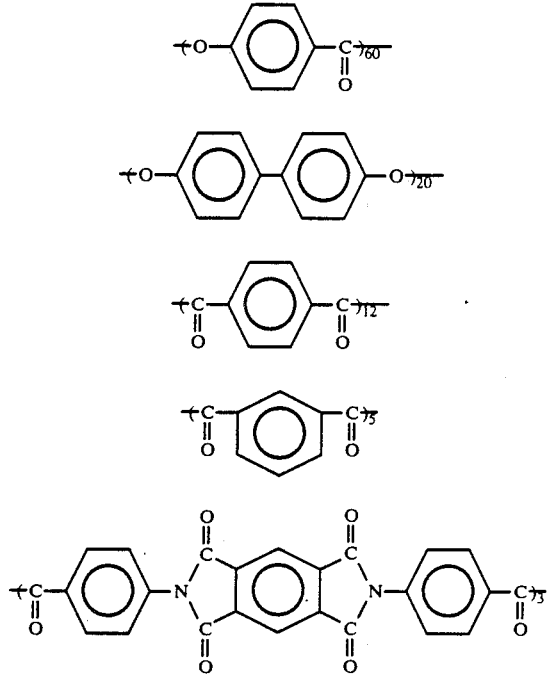

The melt viscosity of the polymer was measured by the same method as Example 1 to be 220 Pa·s at 380° C.

The polymer exhibited optical anisotropy in molten state.

The coefficient of linear expansion, coefficient of mold shrinkage, flexural strength, flexural modulus, and heat distortion temperature of the polymer were measured according to the methods described later. The results are shown in the Table 1.

EXAMPLE 7

Into a 500 ml separable flask were placed
0.720 mol (129.7 g) of p-acetoxybenzoic acid,
0.240 mol (64.87 g) of 4,4'-diacetoxybiphenyl,
0.144 mol (23.92 g) of terephthalic acid,
0.060 mol (9.968 g) of isophthalic acid, and
0.036 mol (16.43 g) of N,N'-bis(4-carboxyphenyl)-pyromellitimide.

After the mixture was heated to 360° C. in 90 minutes with stirring in a stream of nitrogen, polymerization was carried out while distilling acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 72.38 | 3.49 | 0.58 |
| Measured value (%) | 72.37 | 3.51 | 0.57 |

From these results, the polymer was identified to be a copolyimide ester having the structural units and the composition represented by the following formulas.

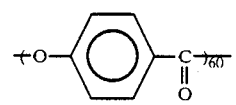

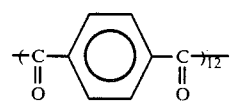

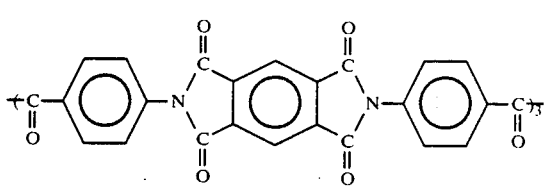

The melt viscosity of the polymer was measured by the same method as Example 1 to be 175 Pa·s at 380° C.

The polymer exhibited optical anisotropy in molten state.

The coefficient of linear expansion, coefficient of mold shrinkage, flexural strength, flexural modulus, and heat distortion temperature of the polymer were measured according to the methods described later. The results are shown in the Table 1.

EXAMPLE 8

Into a 500 ml separable flask were placed
0.072 mol (7.857 g) of p-aminophenol,
0.036 mol (7.852 g) of pyromellitic anhydride, and
100 ml of methyl ethyl ketone,
and the mixture was stirred for one hour at room temperature, to form the precipitate of the amide acid (5) and amide acid (6) represented respectively by the following structural formulas:

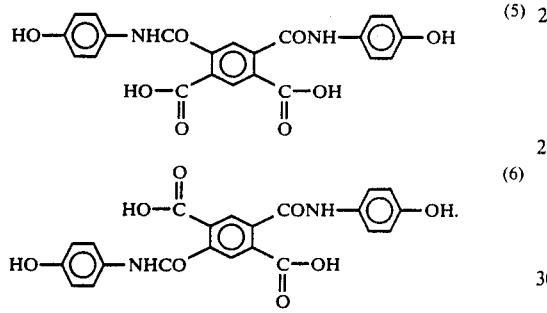

Into the flask were subsequently added
0.600 mol (82.87 g) of p-hydroxybenzoic acid,
0.144 mol (26.82 g) of 4,4'-dihydroxybiphenyl,
0.120 mol (13.21 g) of hydroquinone,
0.180 mol (29.90 g) of terephthalic acid,
0.120 mol (19.94 g) of isophthalic acid, and
1.200 mol (112.8 ml) of acetic anhydride.

After the mixture was heated to 150° C. with stirring in a stream of nitrogen, acetic anhydride was refluxed for one hour. Subsequently, the temperature was raised to 360° C. in 90 minutes, and the dehydration-cyclization of the amide acids and polymerization were carried out, while distilling methyl ethyl ketone, water, and acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 71.40 | 3.41 | 0.61 |
| Measured value (%) | 71.38 | 3.42 | 0.63 |

From these results, the polymer was identified to be a copolyimide ester having the structural units and the composition represented by the following formulas.

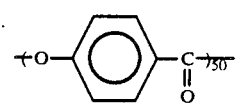

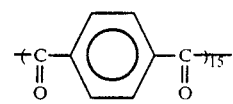

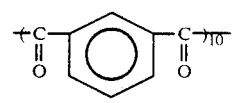

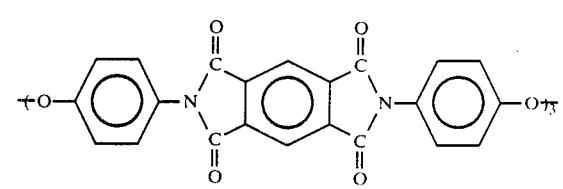

The polymer had a melt viscosity of 320 Pa·s at 350° C. and exhibited optical anisotropy even in molten state.

The coefficient of linear expansion, coefficient of mold shrinkage, flexural strength, flexural modulus, and heat distortion temperature of the polymer were measured according to the methods described later. The results are shown in the Table 1.

Example 9

Into a 500 ml separable flask were placed
0.024 mol (2.619 g) of p-aminophenol,
0.012 mol (2.617 g) of pyromellitic anhydride, and
100 ml of methyl ethyl ketone,
and the mixture was stirred for one hour at room temperature, to form the precipitate of the same amide acid (5) and amide acid (6) as those obtained in Example 8.

Into the flask were subsequently added
0.720 mol (99.45 g) of p-hydroxybenzoic acid,
0.228 mol (42.46 g) of dihydroxybiphenyl,
0.180 mol (29.90 g) of terephthalic acid,
0.060 mol (9.968 g) of isophthalic acid, and
1.200 mol (112.8 ml) of acetic anhydride.

After the mixture was heated to 150° C. with stirring in a stream of nitrogen, acetic anhydride was refluxed for one hour. Subsequently, the temperature was raised to 360° C. in 90 minutes, and the dehydration-cyclization of the amide acids and polymerization were carried out, while distilling methyl ethyl ketone, water, and acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 72.52 | 3.53 | 0.20 |

|                  | C     | H    | N    |
|------------------|-------|------|------|
| Measured value (%) | 72.53 | 3.51 | 0.22 |

Figure 2:
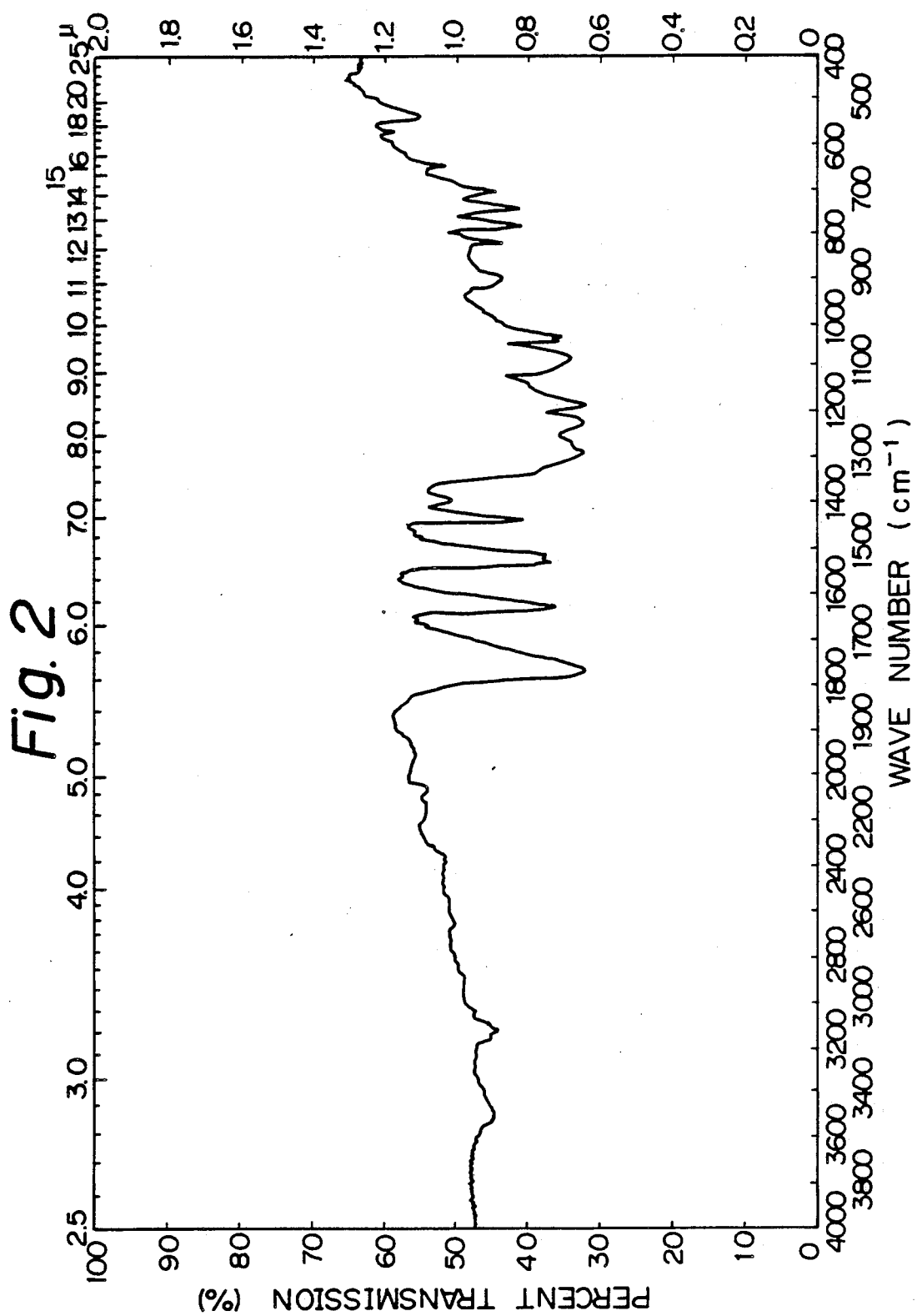
FIG. 2 is an infrared spectrum of the copolyimide ester obtained in Example 9.

The infrared spectrum of the obtained polymer is shown in FIG. 2.

From these results, the polymer was identified to be a copolyimide ester having the structural units and the composition represented by the following formulas.

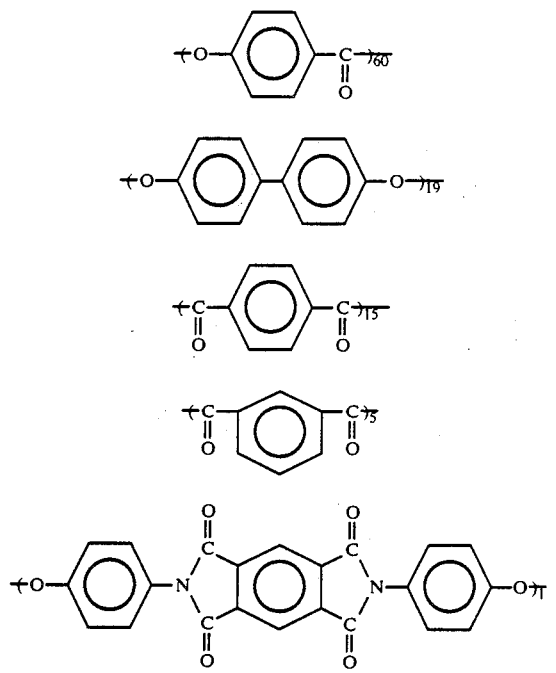

The melt viscosity of the polymer was measured by the same method as Example 1 to be 230 Pa·s at 380° C.

The polymer exhibited optical anisotropy in molten state.

The coefficient of linear expansion, coefficient of mold shrinkage, flexural strength, flexural modulus, and heat distortion temperature of the polymer were measured according to the methods described later. The results are shown in the Table 1.

Example 10

Into a 500 ml separable flask were placed
0.072 mol (7.857 g) of p-aminophenol,
0.036 mol (7.852 g) of pyromellitic anhydride, and
100 ml of methyl ethyl ketone,
and the mixture was stirred for one hour at room temperature, to form the precipitate of the same amide acid (5) and amide acid (6) as those obtained in Example 8.
Into the flask were subsequently added
0.720 mol (99.45 g) of p-hydroxybenzoic acid,
0.204 mol (37.99 g) of dihydroxybiphenyl,
0.120 mol (19.94 g) of terephthalic acid,
0.120 mol (19.94 g) of isophthalic acid, and
1.200 mol (112.8 ml) of acetic anhydride.
After the mixture was heated to 150° C. with stirring in a stream of nitrogen, acetic anhydride was refluxed for one hour. Subsequently, the temperature was raised to 360° C. in 90 minutes, and the dehydration-cyclization of the amide acids and polymerization were carried out, while distilling methyl ethyl ketone, water, and acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|                     | C     | H    | N    |
|---------------------|-------|------|------|
| Theoretical value (%) | 71.99 | 3.48 | 0.59 |
| Measured value (%)    | 71.97 | 3.46 | 0.61 |

From these results, the polymer was identified to be a copolyimide ester having the structural units and the composition represented by the following formulas.

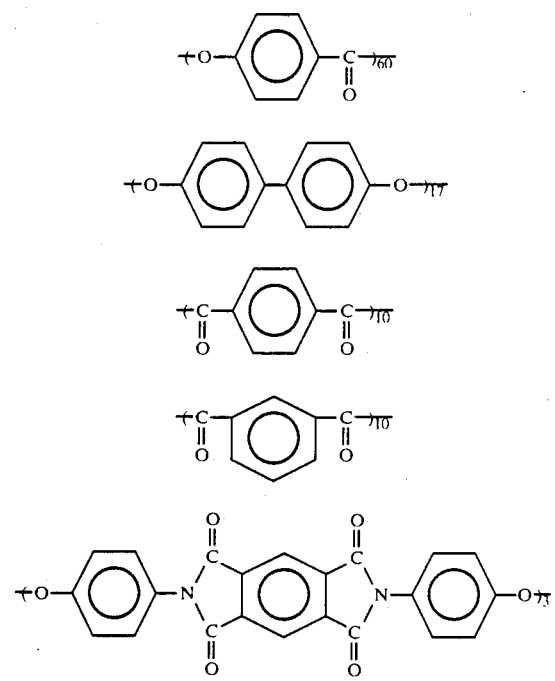

The melt viscosity of the polymer was measured by the same method as Example 1 to be 170 Pa·s at 330° C.

The polymer exhibited optical anisotropy in molten state.

The coefficient of linear expansion, coefficient of mold shrinkage, flexural strength, flexural modulus, and heat distortion temperature of the polymer were measured according to the methods described later. The results are shown in the Table 1.

EXAMPLE 11

Into a 500 ml separable flask were placed
0.240 mol (26.19 g) of p-aminophenol,
0.120 mol (26.17 g) of pyromellitic anhydride, and
100 ml of methyl ethyl ketone,
and the mixture was stirred for one hour at room temperature, to form the precipitate of the same amide acid (5) and amide acid (6) as those obtained in Example 8.
Into the flask were subsequently added
0.720 mol (99.45 g) of p-hydroxybenzoic acid,
0.12 mol (22.35 g) of dihydroxybiphenyl,
0.240 mol (39.88 g) of isophthalic acid, and
1.200 mol (112.8 ml) of acetic anhydride.

After the mixture was heated to 150° C. with stirring in a stream of nitrogen, acetic anhydride was refluxed for one hour. Subsequently, the temperature was raised to 360° C. in 90 minutes, and the dehydration-cyclization of the amide acids and polymerization were carried out, while distilling methyl ethyl ketone, water, and acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 70.50 | 3.22 | 1.79 |
| Measured value (%) | 70.48 | 3.23 | 1.78 |

From these results, the polymer was identified to be a copolyimide ester having the structural units and the composition represented by the following formulas.

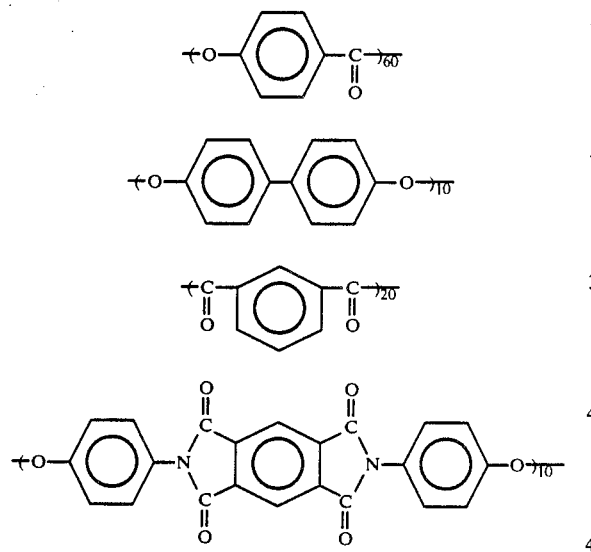

The melt viscosity of the polymer was measured by the same method as Example 1 to be 210 Pa·s at 320° C.

The polymer exhibited optical anisotropy in molten state.

The coefficient of linear expansion, coefficient of mold shrinkage, flexural strength, flexural modulus, and heat distortion temperature of the polymer were measured according to the methods described later. The results are shown in the Table 1.

EXAMPLE 12

Into a 500 ml separable flask were placed
0.072 mol (7.857 g) of p-aminophenol,
0.036 mol (7.852 g) of pyromellitic anhydride, and
100 ml of methyl ethyl ketone,
and the mixture was stirred for one hour at room temperature, to form the precipitate of the same amide acid (5) and amide acid (6) as those obtained in Example 8.

Into the flask were subsequently added
0.84 mol (116.0 g) of p-hydroxybenzoic acid,
0.144 mol (26.82 g) of dihydroxybiphenyl,
0.060 mol (9.968 g) of terephthalic acid,
0.120 mol (19.94 g) of isophthalic acid, and
1.200 mol (112.8 ml) of acetic anhydride.

After the mixture was heated to 150° C. with stirring in a stream of nitrogen, acetic anhydride was refluxed for one hour. Subsequently, the temperature was raised to 360° C. in 90 minutes, and the dehydration-cyclization of the amide acids and polymerization were carried out, while distilling methyl ethyl ketone, water, and acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 71.40 | 3.41 | 0.61 |
| Measured value (%) | 71.38 | 3.43 | 0.62 |

From these results, the polymer was identified to be a copolyimide ester having the structural units and the composition represented by the following formulas.

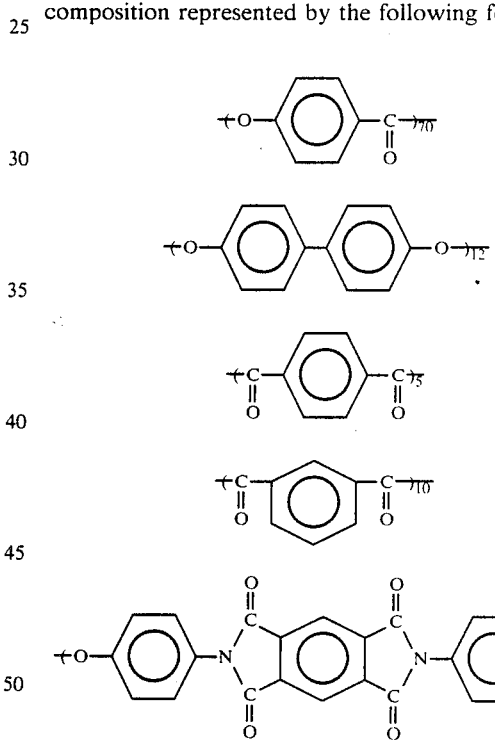

The melt viscosity of the polymer was measured by the same method as Example 1 to be 180 Pa·s at 320° C.

The polymer exhibited optical anisotropy in molten state.

The coefficient of linear expansion, coefficient of mold shrinkage, flexural strength, flexural modulus, and heat distortion temperature of the polymer were measured according to the methods described later. The results are shown in the Table 1.

Example 13

Into a 500 ml separable flask were placed
0.720 mol (99.45 g) of p-hydroxybenzoic acid,
0.204 mol (37.99 g) of dihydroxybiphenyl,
0.120 mol (19.94 g) of terephthalic acid, 0.120 mol (19.94 g) of isophthalic acid,
0.036 mol (14.41 g) of N,N'-bis(4-hydroxyphenyl)-pyromellitimide, and
1.200 mol (112.8 ml) of acetic anhydride.

After the mixture was heated to 150° C. with stirring in a stream of nitrogen, acetic anhydride was refluxed for one hour. Subsequently, the temperature was raised to 360° C. in 90 minutes, and polymerization were then carried out, while distilling acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 71.99 | 3.48 | 0.59 |
| Measured value (%) | 71.99 | 3.49 | 0.61 |

From these results, the polymer was identified to be a copolyimide ester having the structural units and the composition represented by the following formulas.

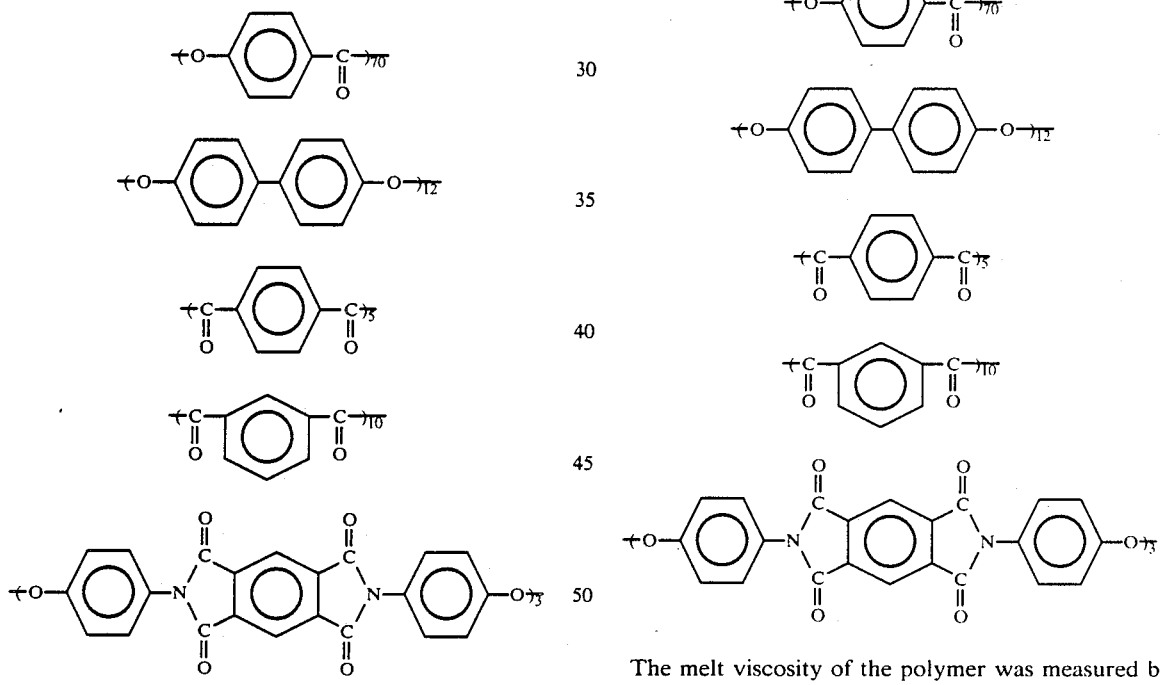

The melt viscosity of the polymer was measured by the same method as Example 1 to be 200 Pa·s at 330° C.

The polymer exhibited optical anisotropy in molten state.

The coefficient of linear expansion, coefficient of mold shrinkage, flexural strength, flexural modulus, and heat distortion temperature of the polymer were measured according to the methods described later. The results are shown in the Table 1.

Example 14

Into a 500 ml separable flask were placed
0.720 mol (129.7 g) of p-acetoxybenzoic acid,
0.204 mol (55.14 g) of 4,4'-diacetoxybiphenyl,
0.120 mol (19.94 g) of terephthalic acid,
0.120 mol (19.94 g) of isophthalic acid, and
0.036 mol (17.44 g) of N,N'-bis(4-acetoxyphenyl)-pyromellitimide.

After the mixture was heated to 360° C. in 90 minutes with stirring in a stream of nitrogen, polymerization was carried out while distilling acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 71.99 | 3.48 | 0.59 |
| Measured value (%) | 71.97 | 3.47 | 0.61 |

From these results, the polymer was identified to be a copolyimide ester having the structural units and the composition represented by the following formulas.

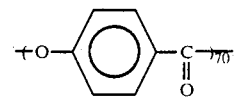

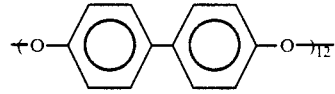

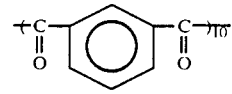

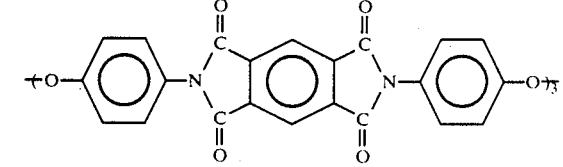

The melt viscosity of the polymer was measured by the same method as Example 1 to be 140 Pa·s at 340° C.

The polymer exhibited optical anisotropy in molten state.

The coefficient of linear expansion, coefficient of mold shrinkage, flexural strength, flexural modulus, and heat distortion temperature of the polymer were measured according to the methods described later. The results are shown in the Table 1.

Compatative Examples 1 TO 5

In each Comparative Example, the measurement procedures of Example 1 were repeated with the exception that the copolyimide ester prepared in Example 1 was replaced by a commercial polybutyleneterephthalate (Duranex 2000 produced by Celanese Co., Ltd., Comparative Example 1), a commercial polycarbonate (A 2200 produced by Idemitsu Petrochemical Co., Ltd., Comparative Example 2), a commercial polyether imide (Ultem 1000 produced by General Electric Company, Comparative Example 3), a commercial thermotropic liquid-crystalline copolyester (Ekonol E 6000 produced by SUMITOMO CHEMICAL CO,. LTD., Comparative Example 4), or a commercial thermotropic liquid-crystalline copolyester (Vectra A 950 produced by Celanese Co., Ltd., Comparative Example 5), respectively.

The results are shown in Table 1.

TABLE 1

|  | Coefficient of linear expansion ($\times 10^{-5}$ cm/cm/°C.) | | Coefficient of mold shrinkage (%) | | Flexural properties | | Heat distortion temperature (°C.) |
|  | MD | TD | MD | TD | Flexural strength (Mpa) | Flexural modulus (Gpa) |  |
|---|---|---|---|---|---|---|---|
| Example 1 | −0.2 | 0.2 | −0.1 | 0.3 | 165 | 17 | 255 |
| Example 2 | −0.1 | 0.3 | 0.0 | 0.4 | 140 | 14 | 265 |
| Example 3 | −0.1 | 0.2 | −0.1 | 0.4 | 170 | 18 | 250 |
| Example 4 | −0.1 | 0.1 | −0.1 | 0.0 | 130 | 10 | 170 |
| Example 5 | −0.2 | 0.1 | −0.1 | 0.2 | 180 | 19 | 253 |
| Example 6 | −0.1 | 0.2 | 0.0 | 0.4 | 172 | 17 | 251 |
| Example 7 | −0.1 | 0.4 | 0.1 | 0.4 | 160 | 15 | 253 |
| Example 8 | −0.1 | 0.1 | −0.2 | 0.1 | 140 | 15 | 247 |
| Example 9 | 0.1 | 0.2 | −0.1 | 0.4 | 120 | 10 | 250 |
| Example 10 | −0.1 | 0.1 | −0.2 | 0.1 | 150 | 16 | 245 |
| Example 11 | −0.2 | −0.1 | −0.2 | 0.0 | 110 | 12 | 178 |
| Example 12 | −0.1 | 0.2 | −0.1 | 0.1 | 160 | 15 | 253 |
| Example 13 | −0.1 | 0.2 | −0.1 | 0.1 | 140 | 16 | 250 |
| Example 14 | 0.1 | 0.4 | 0.0 | 0.4 | 135 | 14 | 254 |
| Comparative Ex. 1 | 10 | 11 | 1.8–2.0 |  | 87 | 2.6 | 80 |
| Comparative Ex. 2 | 6.3 | 6.1 | 0.5–0.7 |  | 92 | 2.3 | 134 |
| Comparative Ex. 3 | 5.6 | 5.7 | 0.5–0.7 |  | 107 | 3.4 | 200 |
| Comparative Ex. 4 | 1.0 | 11 | 0.2 | 1.3 | 96 | 6.5 | 250 |
| Comparative Ex. 5 | 0.1 | 2.2 | 0.1 | 1.2 | 155 | 9.0 | 180 |

The measurement of the coefficient of linear expansion, coefficient of mold shrinkage, flexural properties, and heat distortion temperatures was conducted as follows.

Molding of Test Piece

The molding was conducted by using an injection molder (Toshiba IS 45 P) at a molding temperature of 250° to 350° C. and at a mold temperature of 120° C.

Measuring Methods

1. Coefficient of linear expansion

The measurement of coefficient of linear expansion was conducted in compression mode by using Seiko Thermal Analysis Apparatuses SSC-300 and TMA-100 on a test piece of about 10 (measuring direction)×5×1.6 mm cut out from the center portion of a plate of 63.5×63.5×1.6 mm, under a load of 5 g, at a temperature raising rate of 10° C./min.

2. Coefficient of mold shrinkage

The coefficients of mold shrinkage in MD and TD of the plate described above were calculated by the following formula.

Coefficient of mold shrinkage =

[(Inner size of mold cavity) − (Measured length of test piece)/(Inner size of mold cavity)] × 100 (%)

3. Flexural properties

The measurement of flexural properties was conducted on a test piece of 127×12.7×3.2 mm at 23° C. using HTM 250 produced by Toyo Seiki Co., Ltd.

The other conditions were accordant to ASTM-D-790.

4. Heat distortion temperature

The measurement of heat distortion temperature was conducted on a test piece of 127×12.7×3.2 mm under a load of 18.6 kg/cm² using an apparatus produced by Toyo Seiki Co., Ltd.

The other test conditions were accordant to ASTM-D-648.

Synthetic Example 2

Synthesis of the Compound (IV 2′)

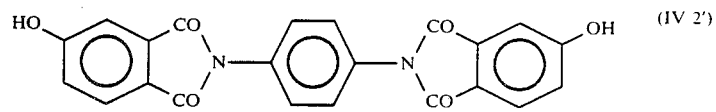
(IV 2′)

59.08 g (0.36 mol) of hydroxyphthalic anhydride and 19.47 g (0.18 mol) of p-phenylenediamine were dissolved in 200 ml of dimethylformamide (DMF), and DMF was then refluxed. Directly after beginning the reflux, yellow, powdery crystals started to precipitate. After 2.5 hours of reflux, the reaction mixture was cooled. After filtration of the reaction product, the obtained crystals were washed with successive, DMF and acetone, and were dried to obtain the objective compound (IV2′).

The results of the elementary analysis of the obtained compound were as follows:

|  | C | H | N |
|---|---|---|---|
| Theoretical value (%) | 66.0 | 3.02 | 7.00 |
| Measured value (%) | 66.1 | 3.04 | 7.01 |

Example 15

Into a 500 ml separable flask were placed 0.024 mol (3.939 g) of hydroxyphthalic anhydride, 0.012 mol (1.298 g) of p-phenylenediamine, and 100 ml of methyl ethyl ketone, and the mixture was stirred for one hour at room temperature, to form the precipitate of the compound (IV 2") ($Y^4$ and $Y^5$: H).

Into the flask were subsequently added
0.720 mol (99.45 g) of p-hydroxybenzoic acid,
0.120 mol (22.34 g) of 4,4'-dihydroxybiphenyl,
0.108 mol (11.89 g) of hydroquinone,
0.180 mol (29.90 g) of terephthalic acid,
0.060 mol (9.968 g) of isophthalic acid, and
1.200 mol (112.8 ml) of acetic anhydride.

After the mixture was heated to 150° C. with stirring in a stream of nitrogen, acetic anhydride was refluxed for one hour. Subsequently, the temperature was raised to 360° C. in 90 minutes, and the dehydration-cyclization of the amide acids and polymerization were carried out, while distilling methyl ethyl ketone, water, and acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 71.40 | 3.44 | 0.21 |
| Measured value (%) | 71.42 | 3.45 | 0.22 |

From these results, the polymer was identified to be a copolyimide ester having the structural units and the composition represented by the following formulas.

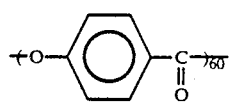

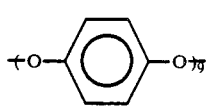

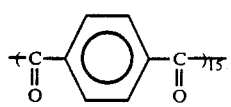

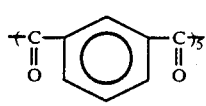

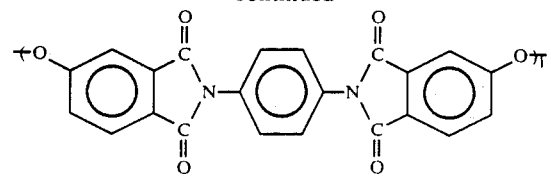

The melt viscosity of the polymer was measured by the same method as Example 1 to be 280 Pa·s at 380° C.

The polymer exhibited optical anisotropy even in molten state.

The coefficient of linear expansion, coefficient of mold shrinkage, flexural strength, flexural modulus, and heat distortion temperature of the polymer were measured according to the methods described above. The results are shown in the Table 2.

Example 16

Into a 500 ml separable flask were placed
0.240 mol (39.39 g) of hydroxyphthalic anhydride,
0.120 mol (12.98 g) of p-phenylenediamine, and
100 ml of methyl ethyl ketone, and the mixture was stirred for one hour at room temperature, to form the precipitate of the compound (IV 2") ($Y^4$ and $Y^5$: H).

Into the flask were subsequently added
0.720 mol (99.45 g) of p-hydroxybenzoic acid,
0.120 mol (22.34 g) of 4,4'-dihydroxybiphenyl,
0.144 mol (23.92 g) of terephthalic acid,
0.096 mol (15.95 g) of isophthalic acid, and
1.200 mol (112.8 ml) of acetic anhydride.

After the mixture was heated to 150° C. with stirring in a stream of nitrogen, acetic anhydride was refluxed for one hour. Subsequently, the temperature was raised to 360° C. in 90 minutes, and the dehydration-cyclization of the amide acids and polymerization were carried out, while distilling methyl ethyl ketone, water, and acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 70.50 | 3.22 | 1.79 |
| Measured value (%) | 70.51 | 3.23 | 1.80 |

From these results, the polymer was identified to be a copolyimide ester having the structural units and the composition represented by the following formulas.

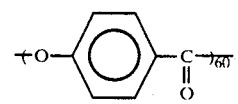

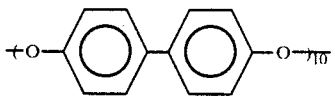

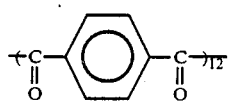

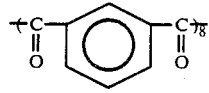

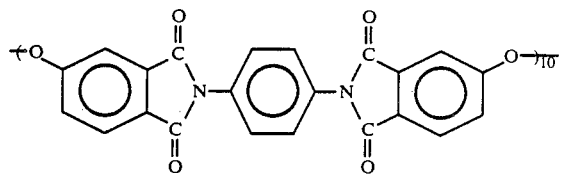

The melt viscosity of the polymer was measured by the same method as Example 1 to be 340 Pa·s at 380° C. The properties of the polymer are shown in Table 2.

The polymer exhibited optical anisotropy in molten state.

Example 17

Into a 500 ml separable flask were placed
0.024 mol (3.939 g) of hydroxyphthalic anhydride,
0.012 mol (1.298 g) of p-phenylenediamine, and
100 ml of methyl ethyl ketone,
and the mixture was stirred for one hour at room temperature, to form the precipitate of the compound (IV 2″) ($Y^4$ and $Y^5$: H).

Into the flask were subsequently added
0.600 mol (82.87 g) of p-hydroxybenzoic acid,
0.288 mol (53.63 g) of 4,4′-dihydroxybiphenyl,
0.240 mol (39.87 g) of terephthalic acid,
0.060 mol (9.968 g) of isophthalic acid, and
1.200 mol (112.8 ml) of acetic anhydride.

After the mixture was heated to 150° C. with stirring in a stream of nitrogen, acetic anhydride was refluxed for one hour. Subsequently, the temperature was raised to 360° C. in 90 minutes, and the dehydration-cyclization of the amide acids and polymerization were carried out, while distilling methyl ethyl ketone, water, and acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
| --- | --- | --- | --- |
| Theoretical value (%) | 73.10 | 3.58 | 0.20 |
| Measured value (%) | 73.12 | 3.60 | 0.21 |

From these results, the polymer was identified to be a copolyimide ester having the structural units and the composition represented by the following formulas.

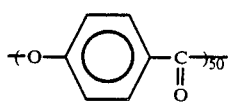

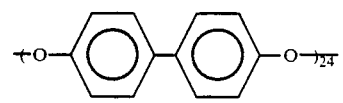

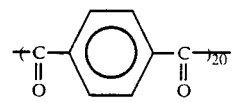

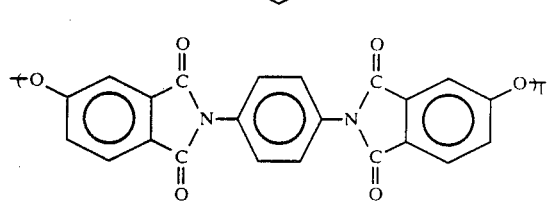

The melt viscosity of the polymer was measured by the same method as Example 1 to be 300 Pa·s at 380° C. The properties of the polymer are shown in Table 2.

The polymer exhibited optical anisotropy in molten state.

Example 18

Into a 500 ml separable flask were placed
0.240 mol (39.39 g) of hydroxyphthalic anhydride,
0.120 mol (12.98 g) of p-phenylenediamine, and
100 ml of methyl ethyl ketone,
and the mixture was stirred for one hour at room temperature, to form the precipitate of the compound (IV 2″) ($Y^4$ and $Y^5$: H).

Into the flask were subsequently added
0.600 mol (82.87 g) of p-hydroxybenzoic acid,
0.180 mol (33.52 g) of 4,4′-dihydroxybiphenyl,
0.204 mol (33.89 g) of terephthalic acid,
0.096 mol (15.95 g) of isophthalic acid, and
1.200 mol (112.8 ml) of acetic anhydride.

After the mixture was heated to 150° C. with stirring in a stream of nitrogen, acetic anhydride was refluxed for one hour. Subsequently, the temperature was raised to 360° C. in 90 minutes, and the dehydration-cyclization of the amide acids and polymerization were carried out, while distilling methyl ethyl ketone, water, and acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
| --- | --- | --- | --- |
| Theoretical value (%) | 71.10 | 3.26 | 1.74 |
| Measured value (%) | 71.11 | 3.28 | 1.75 |

From these results, the polymer was identified to be a copolyimide aster having the structural units and the composition represented by the following formulas.

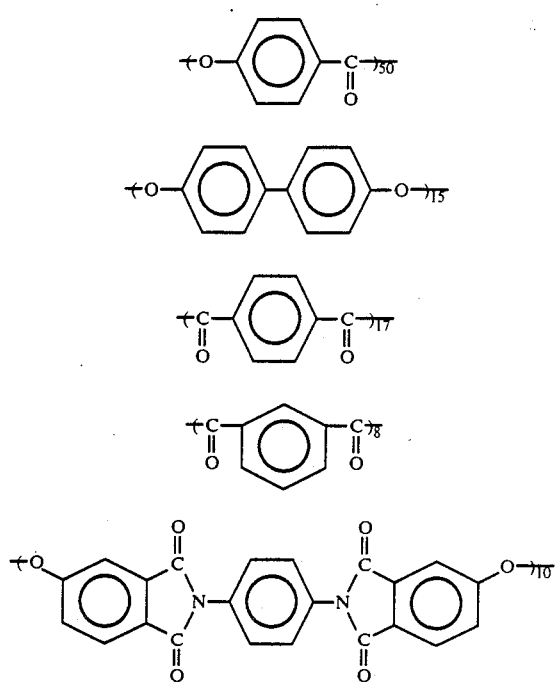

The melt viscosity of the polymer was measured by the same method as Example 1 to be 380 Pa·s at 380° C. The properties of the polymer are shown in Table 2.

The polymer exhibited optical anisotropy in molten state.

Example 19

Into a 500 ml separable flask were placed
0.024 mol (3.939 g) of hydroxythalic anhydride,
0.012 mol (1.298 g) of p-phenylenediamine, and
100 ml of methyl ethyl ketone,
and the mixture was stirred for one hour at room temperature, to form the precipitate of the compound (IV 2″) ($Y^4$ and $Y^5$: H).

Into the flask were subsequently added
0.84 mol (116.0 g) of p-hydroxybenzoic acid,
0.168 mol (31.28 g) of 4,4′-dihydroxybiphenyl,
0.12 mol (19.94 g) of terephthalic acid,
0.060 mol (9.968 g) of isophthalic acid, and
1.200 mol (112.8 ml) of acetic anhydride.

After the mixture was heated to 150° C. with stirring in a stream of nitrogen, acetic anhydride was refluxed for one hour. Subsequently, the temperature was raised to 360° C. in 90 minutes, and the dehydration-cyclization of the amide acids and polymerization were carried out, while distilling methyl ethyl ketone, water, and acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

· The results of the elementary analysis of the obtained polymer were as follows:

|  | C | H | N |
|---|---|---|---|
| Theoretical value (%) | 71.90 | 3.48 | 0.21 |
| Measured value (%) | 71.92 | 3.49 | 0.22 |

From these results, the polymer was identified to be a copolyimide ester having the structural units and the composition represented by the following formulas.

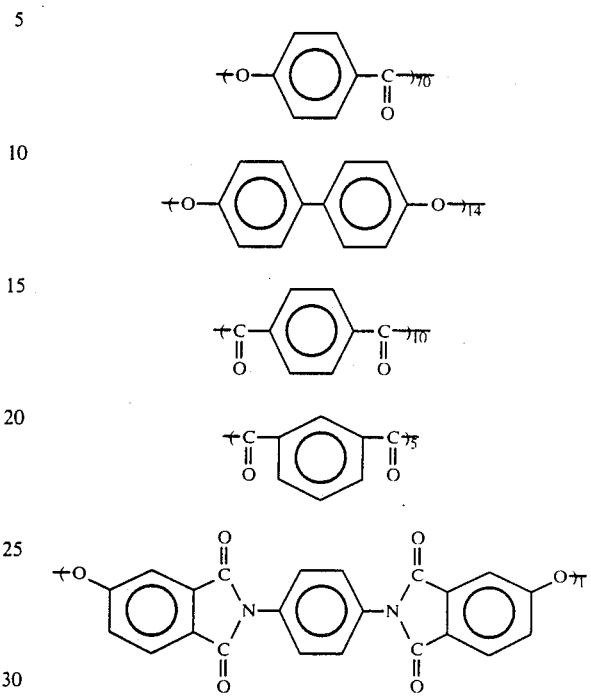

The melt viscosity of the polymer was measured by the same method as Example 1 to be 270 Pa·s at 380° C. The properties of the polymer are shown in Table 2.

The polymer exhibited optical anisotropy in molten state.

Example 20

Into a 500 ml separable flask were placed
0.240 mol (39.90 g) of hydroxyphthalic anhydride,
0.120 mol (12.98 g) of p-phenylenediamine, and
100 ml of methyl ethyl ketone,
and the mixture was stirred for one hour at room temperature, to form the precipitate of the compound (IV 2″) ($Y^4$ and $Y^5$: H).

Into the flask were subsequently added
0.840 mol (116.0 g) of p-hydroxybenzoic acid,
0.060 mol (11.17 g) of 4,4′-dihydroxybiphenyl,
0.084 mol (13.95 g) of terephthalic acid,
0.096 mol (15.95 g) of isophthalic acid, and
1.200 mol (112.8 ml) of acetic anhydride.

After the mixture was heated to 150° C. with stirring in a stream of nitrogen, acetic anhydride was refluxed for one hour. Subsequently, the temperature was raised to 360° C. in 90 minutes, and the dehydration-cyclization of the amide acids and polymerization were carried out, while distilling methyl ethyl ketone, water, and acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 69.90 | 3.16 | 1.83 |

|  | C | H | N |
|---|---|---|---|
| Measured value (%) | 69.92 | 3.17 | 1.84 |

From these results, the polymer was identified to be a copolyimide ester having the structural units and the composition represented by the following formulas.

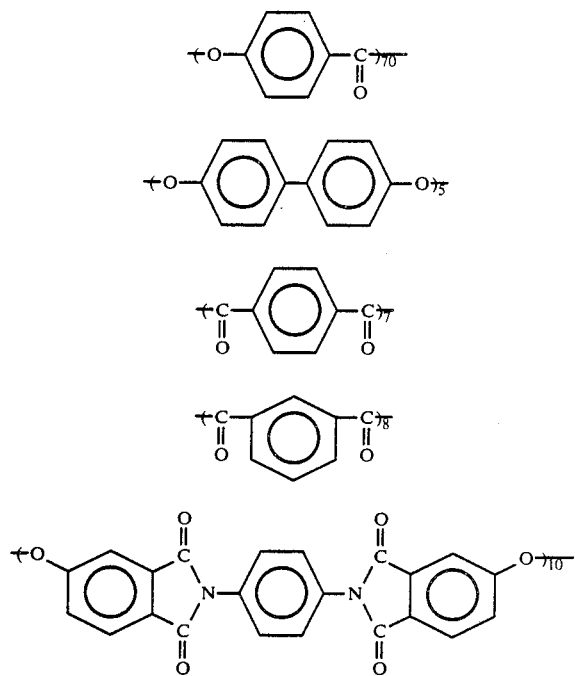

The melt viscosity of the polymer was measured by the same method as Example 1 to be 370 Pa·s at 380° C. The properties of the polymer are shown in Table 2.

The polymer exhibited optical anisotropy in molten state.

Example 2

Into a 500 ml separable flask were placed
0.720 mol (99.45 g) of p-hydroxybenzoic acid,
0.204 mol (37.99 g) of 4,4'-dihydroxybiphenyl,
0.180 mol (29.90 g) of terephthalic acid,
0.060 mol (9.968 g) of isophthalic acid,
0.036 mol (14.41 g) of the compound (IV 2') ($Y^4$ and $Y^5$: H), and
1.200 mol (112.8 ml) of acetic anhydride.

After the mixture was heated to 150° C. with stirring in a stream of nitrogen, acetic anhydride was refluxed for one hour. Subsequently, the temperature was raised to 360° C. in 90 minutes, and polymerization were then carried out, while distilling acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 72.00 | 3.46 | 0.60 |

|  | C | H | N |
|---|---|---|---|
| Measured value (%) | 72.02 | 3.48 | 0.62 |

Figure 3:
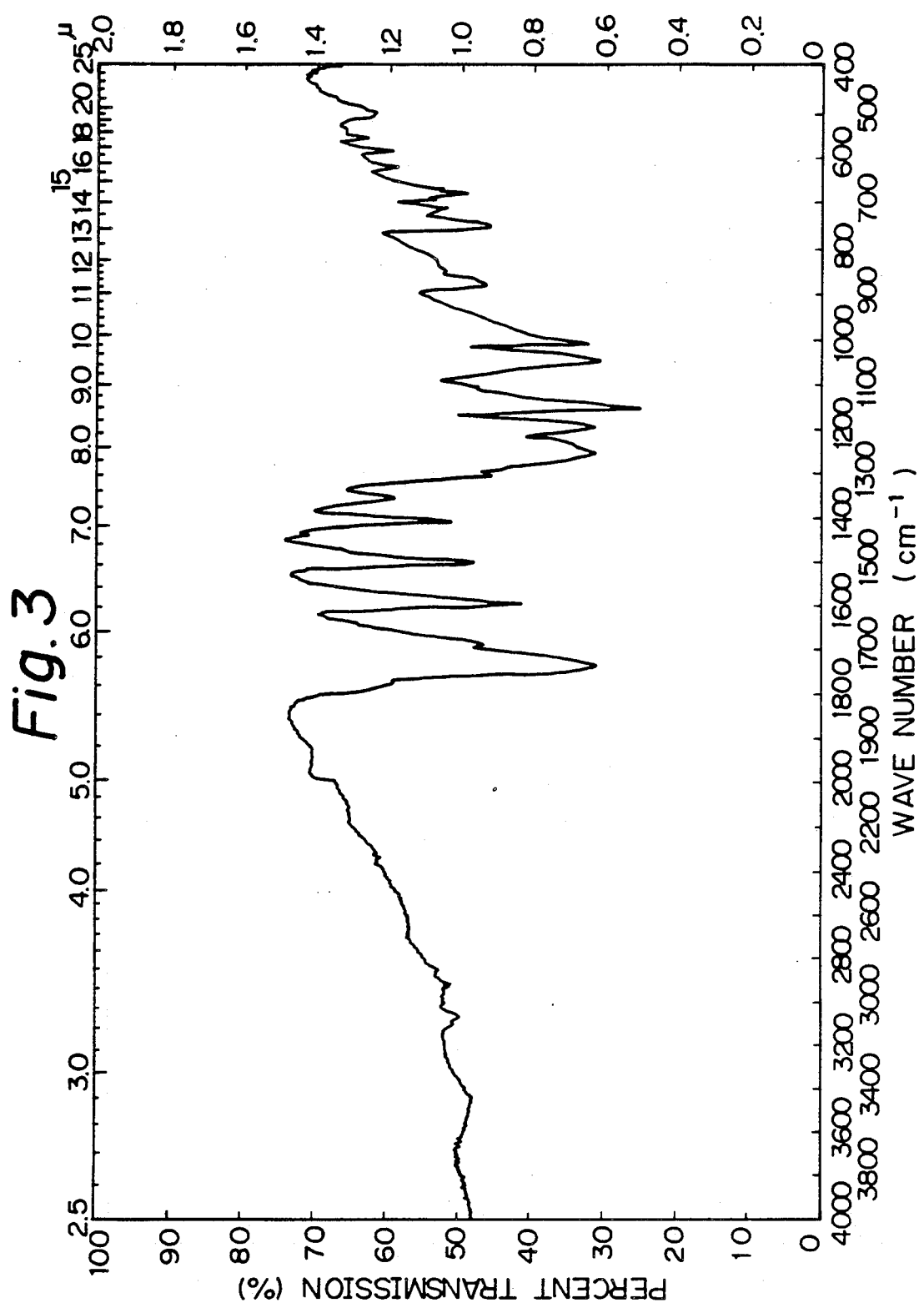
FIG. 3 is an infrared spectrum of the copolyimide ester obtained in Example 21.

The infrared spectrum of the obtained polymer is shown in FIG. 3.

From these results, the polymer was identified to be a copolyimide ester having the structural units and the composition represented by the following formulas.

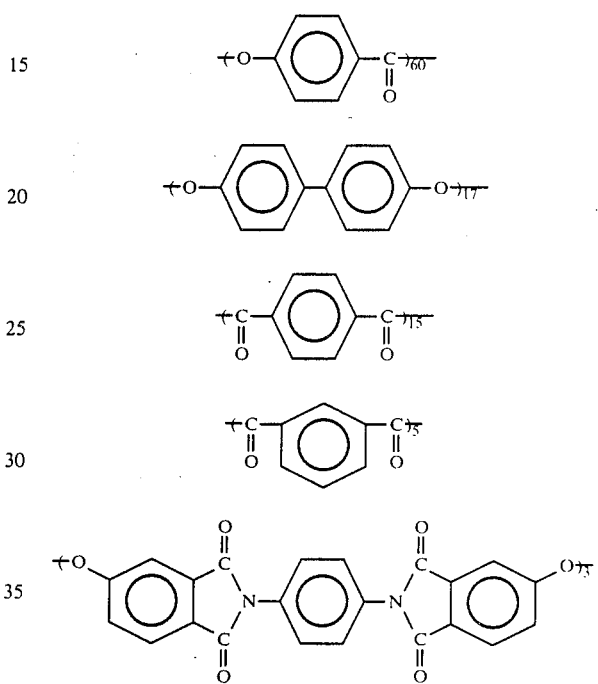

The melt viscosity of the polymer was measured by the same method as Example 1 to be 300 Pa·s at 380° C. The properties of the polymer are shown in Table 2.

The polymer exhibited optical anisotropy in molten state.

Example 22

Into a 500 ml separable flask were placed
0.720 mol (129.7 g) of p-acetoxybenzoic acid,
0.204 mol (55.14 g) of 4,4'-diacetoxybiphenyl,
0.180 mol (29.90 g) of terephthalic acid,
0.060 mol (9.968 g) of isophthalic acid, and
0.036 mol (14.41 g) of the compound (IV 2') ($Y^4$ and $Y^5$: H).

After the mixture was heated to 360° C. in 90 minutes with stirring in a stream of nitrogen, polymerization was carried out while distilling acetic acid out. After the pressure of the reaction system was reduced to 10 torr, the polymerization was continued for 10 minutes and was then continued further for 10 minutes at a reduced pressure of 2 torr. The obtained polymer was collected in a form of molten state.

The results of the elementary analysis of the obtained polymer were as follows:

|  | C | H | N |
|---|---|---|---|
| Theoretical value (%) | 72.00 | 3.46 | 0.60 |

| | C | H | N |
|---|---|---|---|
| Measured value (%) | 72.02 | 3.47 | 0.61 |

From these results, the polymer was identified to be a copolyimide ester having the structural units and the composition represented by the following formulas.

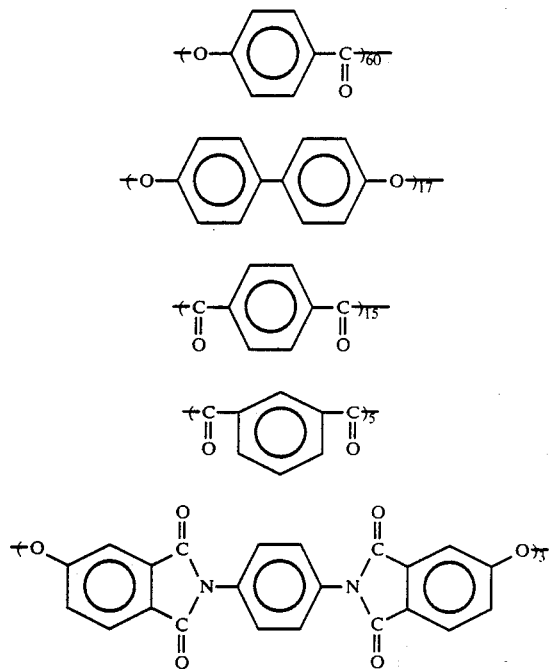

The melt viscosity of the polymer was measured by the same method as Example 1 to be 310 Pa·s at 380° C. The properties of the polymer are shown in Table 2.

The polymer exhibited optical anisotropy in molten state.

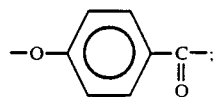  (I)

the recurring unit (II) represented by the following general formula:

  (II)

wherein
n is an integer of 0 or 1;
the recurring unit (III) represented by the following formula:

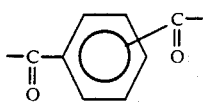  (III)

wherein
the two carbonyl groups are present at para position or meta position of the benzene nucleus to each other;
and the recurring units (IV 1) or (IV 2) represented respectively by the following general formulas;

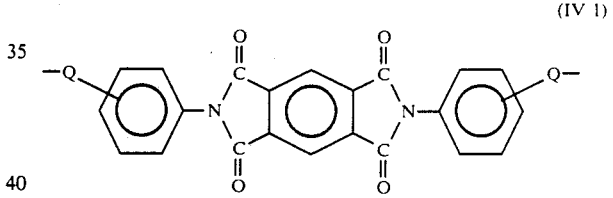  (IV 1)

TABLE 2

| | Coefficient of linear expansion ($\times 10^{-5}$ cm/cm/°C.) | | Coefficient of mold shrinkage (%) | | Flexural properties | | Heat distortion temperature (°C.) |
|---|---|---|---|---|---|---|---|
| | MD | TD | MD | TD | Flexural strength (Mpa) | Flexural modulus (Gpa) | |
| Example 15 | −0.1 | 0.4 | 0.0 | 0.4 | 150 | 16 | 255 |
| Example 16 | −0.1 | 0.1 | −0.1 | 0.0 | 160 | 18 | 210 |
| Example 17 | −0.1 | 0.4 | 0.0 | 0.4 | 155 | 16 | 260 |
| Example 18 | −0.1 | 0.1 | −0.1 | 0.0 | 170 | 19 | 215 |
| Example 19 | −0.1 | 0.3 | 0.0 | 0.4 | 150 | 15 | 250 |
| Example 20 | −0.1 | 0.1 | −0.1 | 0.0 | 180 | 19 | 210 |
| Example 21 | −0.1 | 0.3 | 0.0 | 0.2 | 150 | 17 | 235 |
| Example 22 | −0.1 | 0.3 | 0.0 | 0.2 | 145 | 16 | 232 |

In the Examples 15 to 22, molding of the test pieces was carried out by the same method as that employed in Examples 1 to 14.

The measurement of the coefficient of linear expansion, coefficient of mold shrinkage, flexural properties and heat distortion temperature was conducted by the same way as of Examples 1 to 14.

What is claimed is;

1. A thermoplastic wholly aromatic copolyimide ester consisting essentially of the recurring unit (I) represented by the following formula:

wherein
—Q— is —O— or —CO—
and each Q is present at para position or meta position of the benzene nucleus respectively to the imide group,
or

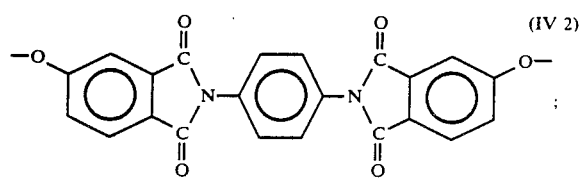 (IV 2)

with the proviso that the recurring units (I), (II), (III), and (IV 1) or (IV 2) are bonded to form ester bonds, and wherein the thermoplastic wholly aromatic copolyimide ester has a melt viscosity of from 1.0 to $1.0 \times 10^5$ Pa·s as measured at a shear stress of 0.025 Mpa and at a temperature of from 300° to 400° C.

2. The thermoplastic wholly aromatic copolyimide ester of claim 1 consisting essentially of the recurring unit (I) represented by the following formula:

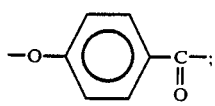 (I)

the recurring unit (II) represented by the following general formula:

 (II)

wherein
n is an integer of 0 or 1;
the recurring unit (III) represented by the following formula:

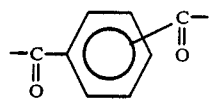 (III)

wherein
the two carbonyl groups are present at para position or meta position of the benzene nucleus to each other;
and the recurring unit (IV 1) represented by the following general formula;

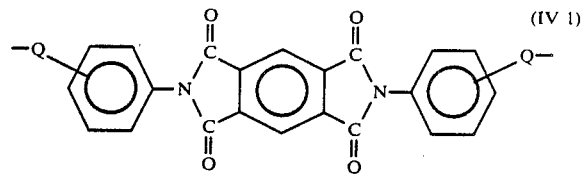 (IV 1)

wherein
—Q— is —O— or —CO—
and each Q is present at para position or meta position of the benzene nucleus respectively to the imide group,
and wherein when —Q— is —CO— then the mole ratio of (I)/[(II)+(III)+(IV 1)] is from (20/80) to (90/10), the mole ratio of (III)/(IV 1) is from (0.1/99.9) to (99.9/0.1), and the mole ratio of (II)/[(III)+(IV 1)] is from (10/11) to (11/10), and when —Q— is —O—, then the mole ratio of (I)/[(II)+(III)+(IV 1)] is from (20/80) to (90/10), the mole ratio of (II)/(IV 1) is from (0.1/99.9) to (99.9/0.1), and the mole ratio of (III)/[(II)+(IV 1)] is from (10/11) to (11/10).

3. The thermoplastic wholly aromatic copolyimide ester of claim 2 consisting essentially of the recurring unit (I) represented by the following formula:

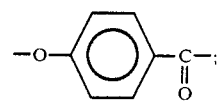

the recurring unit (II) represented by the following formula:

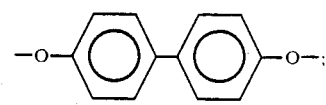

two kinds of the recurring units (III) represented respectively by the following formulas:

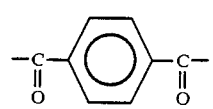

and

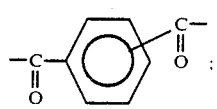

and and the recurring unit (IV 1) represented by the following formula:

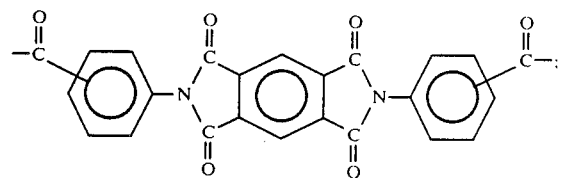

and wherein the thermoplastic wholly aromatic copolyimide ester contains 2 to 22 mol % of the recurring unit (III) represented by the following formula:

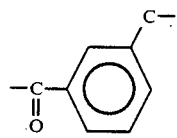

4. The thermoplastic wholly aromatic copolyimide ester of claim 2 consisting essentially of the recurring unit (I) represented by the following formula:

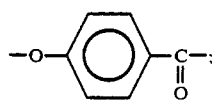

the recurring unit (II) represented by the following formula:

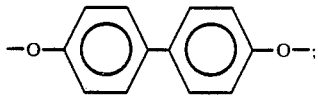

two kinds of the recurring units (III) represented respectively by the following formulas:

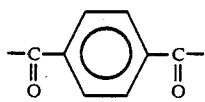

and

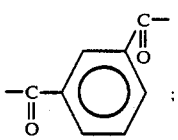

and the recurring unit (IV 1) represented by the following formula:

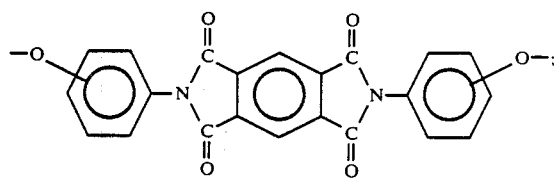

and wherein the thermoplastic wholly aromatic copolyimide ester contains 2 to 22 mol % of the recurring unit (III) represented by the following formula:

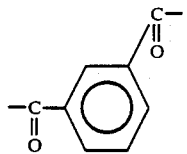

5. The thermoplastic wholly aromatic copolyimide ester of claim 1 consisting essentially of the recurring unit (I) represented by the following formula:

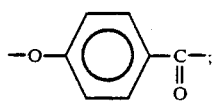

the recurring unit (II) represented by the following general formula:

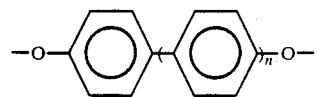

wherein
n is an integer of 0 or 1;
the recurring unit (III) represented by the following formula:

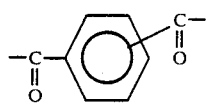

wherein
the two carbonyl groups are present at para position or meta position of the benzene nucleus to each other;
and the recurring unit (IV 2) represented by the following general formula:

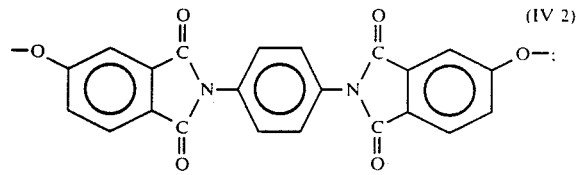

and wherein the mole ratio of (I)/[(II)+(III)+(IV 2)] is from (20/80) to (90/10), the mole ratio of (II)/(IV 2) is from (0.1/99.9) to (99.9/0.1), and the mole ratio of (III)/[(II)+(IV 2)] is from (10/11) to (11/10).

6. A process for producing a thermoplastic wholly aromatic copolyimide ester consisting essentially of the recurring unit (I) represented by the following formula:

the recurring unit (II) represented by the following formula:

wherein
n is an integer of 0 or 1;
the recurring unit (III) represented by the following formula:

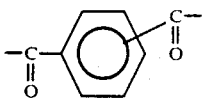

wherein the two carbonyl groups are present at para position or meta position of the benzene nucleus to each other;

and the recurring unit (IV 1) represented by the following general formula:

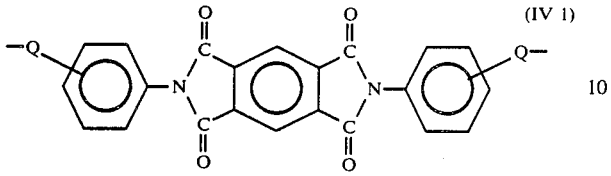

wherein

—Q— is —O— or —CO— and each Q is present at para position or meta position of the benzene nucleus respectively to the imide group;

with the proviso that the recurring units (I), (II), (III), and (IV 1) are bonded to form ester bonds and that when —Q— is —CO—, then the mole ratio of (I)/[(II)+(III)+(IV 1)] is from (20/80) to (90/10), the mole ratio of (III)/(IV 1) is from (0.1/99.9) to (99.9/0.1), and the mole ratio of (II)/[(III)+(IV 1)] is from (10/11) to (11/10), and when —Q— is —O—, then the mole ratio of (I)/[(II)+(III)+(IV 1)] is from (20/80) to (90/10), the mole ratio of (II)/(IV 1) is from (0.1/99.9) to (99.9/0.1), and the mole ratio of (III)/[(II)+(IV 1)] is from (10/11) to (11/10); and the thermoplastic wholly aromatic copolyimide ester having a melt viscosity of from 1.0 to $1.0 \times 10^5$ Pa·s as measured at a shear stress of 0.025 Mpa and at a temperature of from 300° to 400° C., which process comprises:

reacting a compound (I') represented by the following general formula:

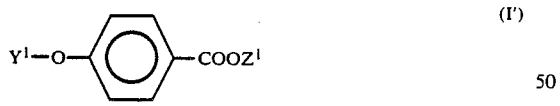

wherein $Y^1$ is hydrogen atom or $R^1CO$—, $R^1$ being a hydrocarbon group of 1 to 18 carbon atoms, and $Z^1$ is hydrogen atom or a hydrocarbon group of 1 to 18 carbon atoms;

a compound (II') represented by the following general formula:

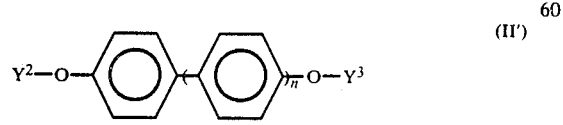

wherein n is an integer of 0 or 1, $Y^2$ is hydrogen atom or $R^2CO$—, and $Y^3$ is hydrogen atom or $R^3CO$—, $R^2$ and $R^3$ being independently a hydrocarbon group of 1 to 18 carbon atoms;

a compound (III') represented by the following general formula:

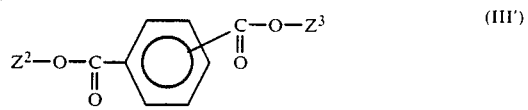

wherein $Z^2$ and $Z^3$ are independently hydrogen atom or a hydrocarbon group of 1 to 18 carbon atoms, and the

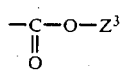

group is present at para position or meta position of the benzene nucleus to the

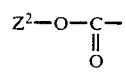

group;

and the compound (IV 1') represented by the following general formula:

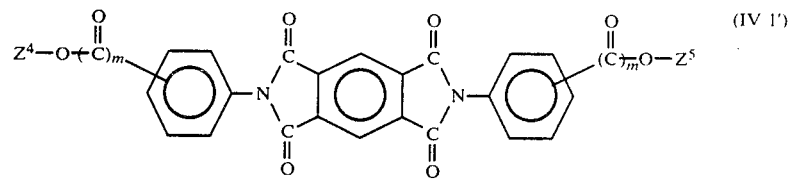

wherein m is an integer of 0 or 1, $Z^4$ is, when m=0, hydrogen atom or $R^4$—CO—, $R^4$ being a hydrocarbon group of 1 to 18 carbon atoms or, when m=1, hydrogen atom or a hydrocarbon group of 1 to 18 carbon atoms, $Z^5$ is, when m=0, hydrogen atom or $R^5$—CO—, $R^5$ being a hydrocarbon group of 1 to 18 carbon atoms or, when m=1, hydrogen atom or a hydrocarbon group of 1 to 18 , carbon atoms,

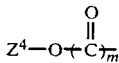

is present at para position or meta position of the benzene nucleus to the imide group, and

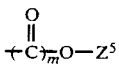

is present at para position or meta position of the benzene nucleus to the imide group;

in such amounts as satisfy, when m=1, a mole ratio of (I')/[(II')+(III')+(IV 1')] of from (20/80) to (90/10), a mole ratio of (III')/(IV 1') of from (0.1/99.9) to (99.9/0.1), and a mole ratio of (II')/[(III')+(IV 1')] of from (10/11) to (11/10) or, when m=0, a mole ratio of (I')/[(II')+(III')+(IV 1')] of from (20/80) to (90/10), a mole ratio of (II')/(IV 1') of from (0.1/99.9) to (99.9/0.1), and a mole ratio of (III')/[(II')+(IV 1')] of from (10/11) to (11/10), so that when m=1, then a compound (V') represented by the following general formula:

$$Y^p-O-Z^q \qquad (V')$$

wherein
Y$^p$ is Y$^1$, Y$^2$ or Y$^3$ and
Z$^q$ is Z$^1$, Z$^2$, Z$^3$, Z$^4$ or Z$^5$,
is eliminated,
or, when m=0, then a compound (VI') represented by the following general formula:

$$Y^p-O-Z^s \qquad (VI')$$

wherein
Y$^p$ is as defined above and
Z$^s$ is Z$^1$, Z$^2$ or Z$^3$,
and a compound (VII') represented by the following general formula:

$$Z^r-O-Z^s \qquad (VII')$$

wherein
Z$^s$ is as defined above,
and Z$^r$ is Z$^4$ or Z$^5$,
are eliminated.

7. A process for producing a thermoplastic wholly aromatic copolyimide ester consisting essentially of the recurring unit (I) represented by the following formula:

(I)

the recurring unit (II) represented by the following general formula:

(II)

wherein
n is an integer of 0 or 1;
the recurring unit (III) represented by the following formula:

(III)

wherein
the two carbonyl groups are present at para position or meta position of the benzene nucleus to each other;
and the recurring unit (IV 1) represented by the following general formula:

(IV 1)

wherein
—Q— is —O— or —CO—
and each Q is present at para position or meta position of the benzene nucleus respectively to the imide groups;
with the proviso that the recurring units (I), (II), (III), and (IV 1) are bonded to form ester bonds and that when —Q— is —CO—, then the mole ratio of (I)/[(II)+(III)+(IV 1)] is from (20/80) to (90/10), the mole ratio of (III)/(IV 1) is from (0.1/99.9) to (99.9/0.1), and the mole ratio of (II)/[(III)+(IV 1)] is from (10/11) to (11/10), and when —Q— is —O—, then the mole ratio of (I)/[(II)+(III)+(IV 1)] is from (20/80) to (90/10), the mole ratio of (II)/(IV 1) is from (0.1/99.9) to (99.9/0.1), and the mole ratio of (III)/[(II)+(IV 1)] is from (10/11) to (11/10); and the thermoplastic wholly aromatic copolyimide ester having a melt viscosity of from 1.0 to $1.0 \times 10^5$ Pa·s as measured at a shear stress of 0.025 Mpa and at a temperature of from 300° to 400° C., which process comprises:
reacting a compound (I') represented by the following general formula:

(I')

wherein
Y$^1$ is hydrogen atom or R$^1$CO—, R$^1$ being a hydrocarbon group of 1 to 18 carbon atoms, and
Z$^1$ is hydrogen atom or a hydrocarbon group of 1 to 18 carbon atoms;
a compound (II') represented by the following general formula:

(II')

wherein
n is an integer of 0 or 1,
Y$^2$ is hydrogen atom or R$^2$CO—, and
Y$^3$ is hydrogen atom or R$^3$CO—,
R$^2$ and R$^3$ being independently a hydrocarbon group of 1 to 18 carbon atoms;
a compound (III') represented by the following general formula:

(III')

wherein $Z^2$ and $Z^3$ are independently hydrogen atom or a hydrocarbon group of 1 to 18 carbon atoms, and the

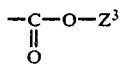

group is present at para position or meta position of the benzene nucleus to the

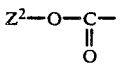

group;
and a compound (IV 1″) represented by the following general formulas:

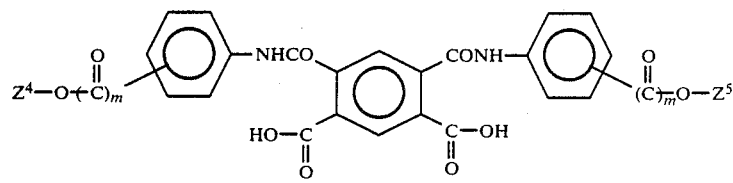

or

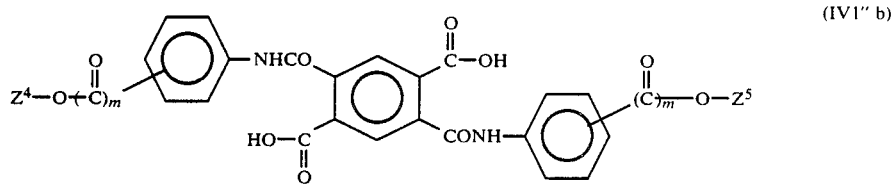

wherein
m is an integer of 0 or 1,
$Z^4$ is, when m=0, hydrogen atom or $R^4$—CO—, $R^4$ being a hydrocarbon group of 1 to 18 carbon atoms or, when m=1, hydrogen atom or a hydrocarbon group of 1 to 18 carbon atoms,
$Z^5$ is, when m=0, hydrogen atom or $R^5$—CO—, $R^5$ being a hydrocarbon group of 1 to 18 carbon atoms or, when m=1, hydrogen atom or a hydrocarbon group of 1 to 18 carbon atoms,

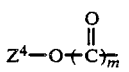

is present at para position or meta position of the benzene nucleus to the amido group, and

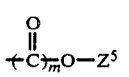

is present at para position or meta position of the benzene nucleus to the amido group;
in such amounts as satisfy, when m=1, a mole ratio of (I′)/[(II′)+(III′)+(IV 1″)] of from (20/80) to (90/10), a mole ratio of (III′)/(IV 1″) of from (0.1/99.9) to (99.9/0.1), and a mole ratio of (II′)/[(III′)+(IV 1″)] of from (10/11) to (11/10) or, when m=0, a mole ratio of (I′)/[(II′)+(III′)+(IV 1″)] of from (20/80) to (90/10), a mole ratio of (II′)/(IV 1″) of from (0.1/99.9) to (99.9/0.1), and a mole ratio of (III′)/[(II′)+(IV 1″)] of from (10/11) to (11/10), so that the compound (IV 1″) is imide-cyclized and, when m is 1, then a compound (V′) represented by the following general formula:

$$Y^p-O-Z^q \qquad (V')$$

wherein
$Y^p$ is $Y^1$, $Y^2$ or $Y^3$ and
$Z^q$ is $Z^1$, $Z^2$, $Z^3$, $Z^4$ or $Z^5$,
is eliminated,
or, when m is 0, then a compound (VI′) represented by the following general formula:

$$Y^p-O-Z^s \qquad (VI')$$

wherein
$Y^p$ is as defined above and
$Z^s$ is $Z^1$, $Z^2$ or $Z^3$,
and a compound (VII′) represented by the following general formula:

$$Z^r-O-Z^s \qquad (VII')$$

wherein
$Z^s$ is as defined above and
$Z^r$ is $Z^4$ or $Z^5$,
are eliminated.

8. A process for producing a thermoplastic wholly aromatic copolyimide ester consisting essentially of the recurring unit (I) represented by the following formula:

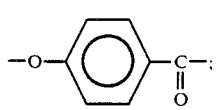

the recurring unit (II) represented by the following general formula:

wherein
n is an integer of 0 or 1;

the recurring unit (III) represented by the following formula:

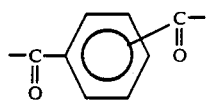
(III)

wherein
the two carbonyl groups are present at para position or meta position of the benzene nucleus to each other;
and the recurring unit (IV 2) represented by the following formula;

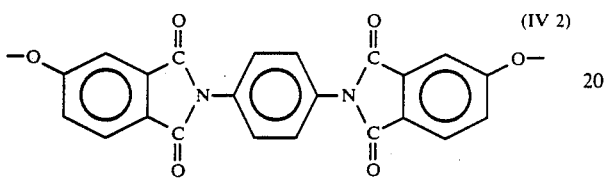
(IV 2)

with the proviso that the recurring units (I), (II), (III), and (IV 2) are bonded to form ester bonds and that the mole ratio of (I)/[(II)+(III)+(IV 2)] is from (20/80) to (90/10), the mole ratio of (II)/(IV 2) is from (0.1/99.9) to (99.9/0.1), and the mole ratio of (III)/[(II)+(IV 2)] is from (10/11) to (11/10);
and the thermoplastic wholly aromatic copolyimide ester having a melt viscosity of from 1.0 to $1.0 \times 10^5$ Pa·s as measured at a shear stress of 0.025 Mpa and at a temperature of from 300° to 400° C., which process comprises:
reacting a compound (I') represented by the following general formula:

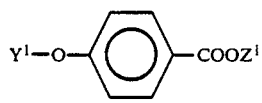
(I')

wherein
$Y^1$ is hydrogen atom or $R^1CO-$, $R^1$ being a hydrocarbon group of 1 to 18 carbon atoms, and
$Z^1$ is hydrogen atom or a hydrocarbon group of 1 to 18 carbon atoms;
a compound (II') represented by the following general formula:

(II')

wherein
n is an integer of 0 or 1,
$Y^2$ is hydrogen atom or $R^2CO-$, and
$Y^3$ is hydrogen atom or $R^3CO-$,
$R^2$ and $R^3$ being independently a hydrocarbon group of 1 to 18 carbon atoms;
a compound (III') represented by the following general formula:

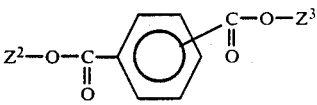
(III')

wherein
$Z^2$ and $Z^3$ are independently hydrogen atom or a hydrocarbon group of 1 to 18 carbon atoms, and the

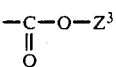

group is present at para position or meta position of the benzene nucleus to the

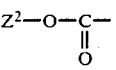

group;
and the compound (IV 2') represented by the following general formula:

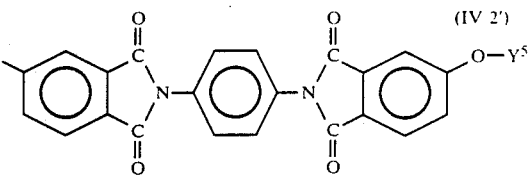
(IV 2')

wherein
$Y^4$ is hydrogen atom or $R^6-CO-$ and
$Y^5$ is hydrogen atom or $R^7-CO-$, $R^6$ and $R^7$ being independently a hydrocarbon group of 1 to 18 carbon atoms;
in such amounts as satisfy a mole ratio of (I')/[(II')+(III')+(IV 2')] of from (20/80) to (90/10), a mole ratio of (II')/(IV 2') of from (0.1/99.9) to (99.9/0.1), and a mole ratio of (III')/[(II')+(IV 2')] of from (10/11) to (11/10),
so that a compound (VIII') represented by the following general formula:

$$Y'-O-Z^u \qquad (VIII')$$

wherein
$Y'$ is $Y^1$, $Y^2$, $Y^3$, $Y^4$ or $Y^5$ and
$Z^u$ is $Z^1$, $Z^2$ or $Z^3$,
is eliminated.
9. A process for producing a thermoplastic wholly aromatic copolyimide ester consisting essentially of the recurring unit (I) represented by the following formula:

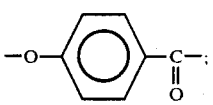
(I)

the recurring unit (II) represented by the following general formula:

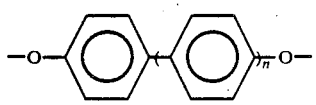
(II)

wherein
n is an integer of 0 or 1;
the recurring unit (III) represented by the following formula:

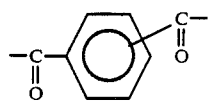
(III)

wherein
the two carbonyl groups are present at para position or meta position of the benzene nucleus to each other;
and the recurring unit (IV 2) represented by the following formula:

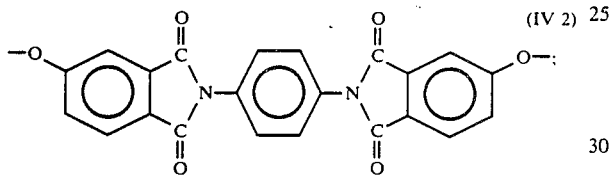
(IV 2)

with the proviso that the recurring units (I), (II), (III), and (IV 2) are bonded to form ester bonds and that the mole ratio of (I)/[(II)+(III); (IV 2)] is from (20/80) to (90/10), the mole ratio of (II)/(IV 2) is from (0.1/99.9) to (99.9/0.1), and the mole ratio of (III)/[(II)+(IV 2)] is from (10/11) to (11/10);
and the thermoplastic wholly aromatic copolyimide ester having a melt viscosity of from 1.0 to $1.0 \times 10^5$ Pa·s as measured at a shear stress of 0.025 Mpa and at a temperature of from 300° to 400° C., which process comprises:
reacting a compound (I') represented by the following general formula:

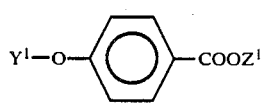
(I')

wherein
$Y^1$ is hydrogen atom or $R^1CO$—, $R^1$ being a hydrocarbon group of 1 to 18 carbon atoms, and
$Z^1$ is hydrogen atom or a hydrocarbon group of 1 to 18 carbon atoms;
a compound (II') represented by the following general formula:

(II')

wherein
n is an integer of 0 or 1,
$Y^2$ is hydrogen atom or $R^2CO$—, and
$Y^3$ is hydrogen atom or $R^3CO$—,
$R^2$ and $R^3$ being independently a hydrocarbon group of 1 to 18 carbon atoms;
a compound (III') represented by the following general formula:

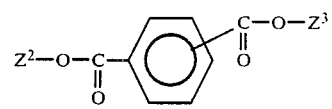
(III')

wherein
$Z^2$ and $Z^3$ are independently hydrogen atom or a hydrocarbon group of 1 to 18 carbon atoms, and the

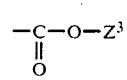

group is present at para position or meta position of the benzene nucleus to the

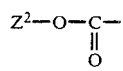

group;
and a compound (IV 2') represented by the following general formula:

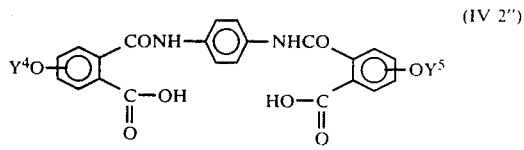
(IV 2")

wherein
$Y^4$ is hydrogen atom or $R^6$—CO—,
$Y^5$ is hydrogen atom or $R^7$—CO—, $R^6$ and $R^7$ being independently a hydrocarbon group of 1 to 18 carbon atoms, and
each $Y^4O$— and —$OY^5$ is present at para position or meta position of the benzene nucleus respectively to the amido group;
in such amounts as satisfy a mole ratio of (I')/[(II')+(III')+(IV 2")] of from (20/80) to (90/10), a mole ratio of (II')/(IV 2") of from (0.1/99.9) to (99.9/0.1), and a mole ratio of (III')/[(II')+(IV 2")] of from (10/11) to (11/10),
so that the compound (IV 2") is imide-cyclized and a compound (VIII') represented by the following general formula:

$Y^t$—O—$Z^u$   (VIII')

wherein
$Y^t$ is $Y^1$, $Y^2$, $Y^3$, $Y^4$ or $Y^5$ and
$Z^u$ is $Z^1$, $Z^2$ or $Z^3$,
is eliminated.

* * * * *